(12) United States Patent
Chou et al.

(10) Patent No.: US 10,085,207 B2
(45) Date of Patent: Sep. 25, 2018

(54) TECHNIQUES FOR IMPROVED ENERGY-SAVINGS MANAGEMENT

(71) Applicant: Intel Corporation, Santa Clara, CA (US)

(72) Inventors: Joey Chou, Scottsdale, AZ (US); Muthaiah Venkatachalam, Beaverton, OR (US); Alexander Sirotkin, Petach Tikva (IL)

(73) Assignee: INTEL CORPORATION, Santa Clara, CA (US)

( * ) Notice: Subject to any disclaimer, the term of this patent is extended or adjusted under 35 U.S.C. 154(b) by 311 days.

(21) Appl. No.: 13/627,288

(22) Filed: Sep. 26, 2012

(65) Prior Publication Data

US 2013/0258923 A1 Oct. 3, 2013

Related U.S. Application Data

(60) Provisional application No. 61/591,641, filed on Jan. 27, 2012.

(51) Int. Cl.
   *H04W 52/02* (2009.01)
   *H04W 8/02* (2009.01)
   *H04W 36/22* (2009.01)

(52) U.S. Cl.
   CPC .......... *H04W 52/0206* (2013.01); *H04W 8/02* (2013.01); *H04W 36/22* (2013.01); *Y02D 70/1222* (2018.01); *Y02D 70/1224* (2018.01); *Y02D 70/1242* (2018.01); *Y02D 70/1244* (2018.01); *Y02D 70/1246* (2018.01); *Y02D 70/1262* (2018.01); *Y02D 70/1264* (2018.01); *Y02D 70/146* (2018.01); *Y02D 70/168* (2018.01); *Y02D 70/21* (2018.01); *Y02D 70/23* (2018.01)

(58) Field of Classification Search
   CPC . H04W 84/12; H04W 52/02; H04W 52/0203; H04W 52/0206; H04W 36/22; H04W 8/02; Y02D 70/1262
   See application file for complete search history.

(56) References Cited

U.S. PATENT DOCUMENTS

2004/0141490 A1* 7/2004 Hong ............................. 370/345
2004/0215504 A1* 10/2004 Ikezawa ......................... 705/11
(Continued)

FOREIGN PATENT DOCUMENTS

| CN | 101409901 | 4/2009 |
| CN | 101835247 | 9/2010 |

OTHER PUBLICATIONS

3GPP TR 32.834 V2.0.0 (Nov. 2011).*
(Continued)

*Primary Examiner* — Phong La

(57) ABSTRACT

Techniques for improved energy-savings management are described. In various embodiments, for example, a network management node includes a processor circuit, a communication component arranged for execution by the processor circuit to receive device tracking information from a device tracking node, and a determination component arranged for execution by the processor circuit to determine whether an eNodeB is to enter an energy-saving mode based on the device tracking information. Other embodiments are described and claimed.

26 Claims, 10 Drawing Sheets

(56) References Cited

U.S. PATENT DOCUMENTS

| | | | |
|---|---|---|---|
| 2004/0253996 A1* | 12/2004 | Chen et al. | 455/574 |
| 2006/0094476 A1* | 5/2006 | Guy | 455/574 |
| 2007/0066273 A1* | 3/2007 | Laroia et al. | 455/343.2 |
| 2007/0106843 A1* | 5/2007 | Mori et al. | 711/114 |
| 2007/0274244 A1* | 11/2007 | Yoon | H04W 52/0216 370/311 |
| 2008/0045224 A1* | 2/2008 | Lu et al. | 455/446 |
| 2009/0059829 A1* | 3/2009 | Bachmann et al. | 370/311 |
| 2009/0092111 A1 | 4/2009 | Horn et al. | |
| 2009/0122783 A1* | 5/2009 | Tanaka et al. | 370/350 |
| 2009/0163238 A1* | 6/2009 | Rao et al. | 455/522 |
| 2009/0187779 A1* | 7/2009 | Liu et al. | 713/323 |
| 2009/0285191 A1* | 11/2009 | Fang | H04L 1/1825 370/338 |
| 2010/0124223 A1 | 5/2010 | Gibbs et al. | |
| 2010/0128646 A1* | 5/2010 | Gao | 370/312 |
| 2010/0142486 A1 | 6/2010 | Wahlqvist et al. | |
| 2010/0151878 A1* | 6/2010 | Nader et al. | 455/456.1 |
| 2010/0153590 A1* | 6/2010 | Hsin et al. | 710/22 |
| 2010/0184432 A1* | 7/2010 | Yano | H04W 36/12 455/435.1 |
| 2010/0220662 A1* | 9/2010 | Di et al. | 370/328 |
| 2010/0272050 A1* | 10/2010 | Lim et al. | 370/329 |
| 2010/0284316 A1 | 11/2010 | Sampathkumar | |
| 2010/0311421 A1* | 12/2010 | Mach | 455/436 |
| 2011/0211514 A1 | 1/2011 | Hamalainen et al. | |
| 2011/0170466 A1* | 7/2011 | Kwun | 370/311 |
| 2011/0225440 A1 | 9/2011 | Kwon et al. | |
| 2011/0237257 A1* | 9/2011 | Soliman | H04W 36/165 455/436 |
| 2011/0256826 A1 | 10/2011 | Ode et al. | |
| 2011/0275371 A1* | 11/2011 | Roger | H04W 60/04 455/435.1 |
| 2011/0287756 A1* | 11/2011 | Cho et al. | 455/418 |
| 2011/0302638 A1* | 12/2011 | Cha et al. | 726/6 |
| 2012/0046084 A1* | 2/2012 | Chuang et al. | 455/574 |
| 2012/0115454 A1* | 5/2012 | Liao | H04W 60/02 455/418 |
| 2012/0276904 A1* | 11/2012 | Bachmann et al. | 455/436 |
| 2012/0289178 A1 | 11/2012 | Matsumura et al. | |
| 2012/0300640 A1* | 11/2012 | Okabe et al. | 370/241 |
| 2013/0107727 A1* | 5/2013 | Lunden et al. | 370/252 |
| 2013/0157661 A1* | 6/2013 | Bhaskaran et al. | 455/436 |

OTHER PUBLICATIONS

International Search Report and Written Opinion received for PCT Patent Application No. PCT/US2013/023305, dated May 14, 2013, 9 pages.

3GPP Technical Report 32.834 v. 11.0.0, published Jan. 9, 2012.

3GPP Specification Group TSG-SA5 document S5-113209, titled "Inter-RAT ESM concept to support idle mode UE," submitted to 3GPP Specification Group TSG-SA5 Meeting S5-79, Oct. 10-14, 2011.

Notice of Patent Allowance for Japanese Patent Application No. 2014-554888, dated Mar. 1, 2016 1 page (untranslated).

Notice of Patent Allowance for Russian Patent Application No. 2014-131732, dated Mar. 1, 2016 13 pages (untranslated).

Office Action and Search Report received for Chinese Patent Application No. 201380006678.4, dated May 3, 2017, 12 pages (untranslated).

* cited by examiner

| | Mobile Device ID | Device Tracking Information |
|---|---|---|
| 301 → | MD-A | Tracking Information 302 |
| 303 → | MD-B | Tracking Information 304 |
| 305 → | MD-C | Tracking Information 306 |
| 307 → | MD-D | Tracking Information 308 |
| 309 → | MD-E | Tracking Information 310 |

| | Mobile Device ID | Device Tracking Information | | |
|---|---|---|---|---|
| | | *Mode* | *Serving MDIN ID* | *RS State* |
| 321 → | MD-A | Idle | MDIN #1 | Active |
| 323 → | MD-B | Idle | MDIN #1 | Active |
| 325 → | MD-C | Idle | MDIN #1 | Inactive |
| 327 → | MD-D | Idle | MDIN #2 | Active |
| 329 → | MD-E | Idle | MDIN #2 | Inactive |

| | Mobile Device ID | Device Tracking Information | | |
|---|---|---|---|---|
| | | *Mode* | *Serving MDIN ID* | *Handoff Possible?* |
| 341 → | MD-F | Connected | MDIN #1 | Possible |
| 343 → | MD-G | Connected | MDIN #1 | Not Possible |
| 345 → | MD-H | Connected | MDIN #2 | Possible |

- RECEIVE DEVICE TRACKING INFORMATION
  402
- ADD DEVICE TRACKING INFORMATION TO DEVICE TRACKING TABLE
  404
- RECEIVE SERVICE SUSTAINABILITY INFORMATION QUERY
  406
- GENERATE SERVICE SUSTAINABILITY INFORMATION
  408
- TRANSMIT SERVICE SUSTAINABILITY INFORMATION
  410

*FIG. 8*

Storage Medium 800

*Computer Executable Instructions for 400*

*Computer Executable Instructions for 700*

TECHNIQUES FOR IMPROVED ENERGY-SAVINGS MANAGEMENT

RELATED CASE

This application claims priority to U.S. Provisional Patent Application No. 61/591,641, filed Jan. 27, 2012, the entirety of which is hereby incorporated by reference.

BACKGROUND

Some wireless communications systems may implement an energy-savings management algorithm that allows under-utilized mobile device interface nodes such as eNodeBs to be deactivated according to an energy-saving mode in order to conserve power. When a mobile device interface node is deactivated, a mobile device served by that mobile device interface node may experience an interruption or degradation of service upon its deactivation, unless it is able to realize effectively continuous service by obtaining service from an alternate mobile device interface node. Since interruption or degradation of service is typically undesirable, an operator policy may define limits to the number of mobile devices that may experience service interruption or degradation upon deactivation of a mobile device interface node. When the number of mobile devices that may experience service interruption or degradation exceeds a threshold, the operator policy may stipulate that the serving mobile device interface node may not be deactivated. Implementing an energy-savings management algorithm in compliance with such an operator policy may offer reduced system power consumption while limiting incidences of loss or degradation of service. However, in conventional systems, information regarding whether the mobile devices served by a mobile device interface node can connect or be handed off to alternate mobile device interface nodes may not be readily available, and thus implementation of such an energy-savings management algorithm in compliance with such an operator policy may be impracticable or cumbersome. Accordingly, techniques for improved energy-savings management may be desirable.

BRIEF DESCRIPTION OF THE DRAWINGS

FIG. 3A illustrates an embodiment of a first device tracking table.

FIG. 3B illustrates an embodiment of a second device tracking table.

FIG. 3C illustrates an embodiment of a third device tracking table.

FIG. 4 illustrates an embodiment of a first logic flow.

FIG. 8 illustrates an embodiment of a storage medium.

DETAILED DESCRIPTION

Figure 1:
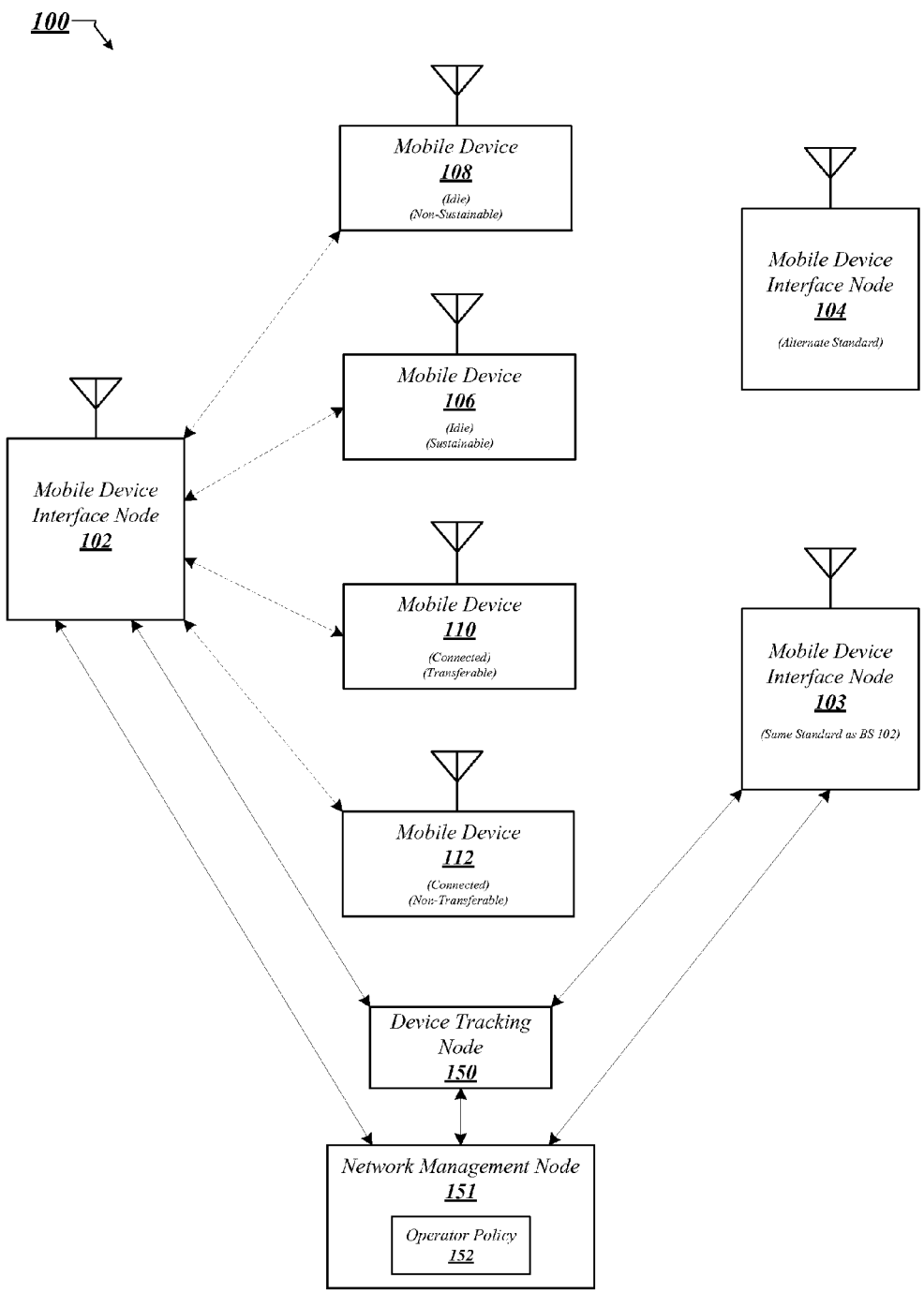
FIG. 1 illustrates an embodiment of a communications environment.

Various embodiments are generally directed to techniques for improved energy-savings management. In some embodiments, for example, a network management node may comprise a processor circuit, a communication component arranged for execution by the processor circuit to receive device tracking information from a device tracking node, and a determination component arranged for execution by the processor circuit to determine whether an eNodeB is to enter an energy-saving mode based on the device tracking information. Other embodiments are described and claimed.

The techniques disclosed herein may involve transmission of content over one or more wireless connections using one or more wireless mobile broadband technologies. Examples of wireless mobile broadband technologies may include without limitation any of the Institute of Electrical and Electronics Engineers (IEEE) 802.16m and 802.16p standards, 3rd Generation Partnership Project (3GPP) Long Term Evolution (LTE) and LTE-Advanced (LTE ADV) standards, and International Mobile Telecommunications Advanced (IMT-ADV) standards, including their revisions, progeny and variants. Other suitable examples may include without limitation Global System for Mobile Communications (GSM)/Enhanced Data Rates for GSM Evolution (EDGE) technologies, Universal Mobile Telecommunications System (UMTS)/High Speed Packet Access (HSPA) technologies, Worldwide Interoperability for Microwave Access (WiMAX) or the WiMAX II technologies, Code Division Multiple Access (CDMA) 2000 system technologies (e.g., CDMA2000 1xRTT, CDMA2000 EV-DO, CDMA EV-DV, and so forth), High Performance Radio Metropolitan Area Network (HIPERMAN) technologies as defined by the European Telecommunications Standards Institute (ETSI) Broadband Radio Access Networks (BRAN), Wireless Broadband (WiBro) technologies, GSM with General Packet Radio Service (GPRS) system (GSM/GPRS) technologies, High Speed Downlink Packet Access (HSDPA) technologies, High Speed Orthogonal Frequency-Division Multiplexing (OFDM) Packet Access (HSOPA) technologies, High-Speed Uplink Packet Access (HSUPA) system technologies, 3GPP Rel. 8 and 9 of LTE/System Architecture Evolution (SAE), and so forth. The embodiments are not limited in this context.

By way of example and not limitation, various embodiments may be described with specific reference to various 3GPP LTE and LTE ADV standards, such as the 3GPP LTE Evolved UMTS Terrestrial Radio Access Network (E-UTRAN), Universal Terrestrial Radio Access (E-UTRA) and LTE ADV Radio Technology 36 Series of Technical Specifications (collectively, "the LTE Specifications"), and IEEE 802.16 standards, such as the IEEE 802.16-2009 standard and current third revision to IEEE 802.16 referred to as "802.16Rev3" consolidating standards 802.16-2009, 802.16h-2010 and 802.16m-2011, and the IEEE 802.16p draft standards including IEEE P802.16.1b/D2 January 2012 titled "Draft Amendment to IEEE Standard for Wireless-MAN-Advanced Air Interface for Broadband Wireless Access Systems, Enhancements to Support Machine-to-Machine Applications" (collectively "IEEE 802.16 Standards"), and any drafts, revisions or variants of the 3GPP LTE Specifications and the IEEE 802.16 Standards. Various embodiments may comprise wireless communications according to one or more techniques described in 3GPP Technical Report 32.834 v. 11.0.0, published Jan. 9, 2012, and/or according to one or more techniques described in 3GPP Specification Group TSG-SA5 document S5-113209, titled "Inter-RAT ESM concept to support idle mode UE," submitted to 3GPP Specification Group TSG-SA5 Meeting S5-79, Oct. 10-14, 2011. Although some embodiments may be described as a 3GPP LTE Specifications or IEEE 802.16

Standards system by way of example and not limitation, it may be appreciated that other types of communications system may be implemented as various other types of mobile broadband communications systems and standards. The embodiments are not limited in this context.

In addition to or alternatively to transmission over one or more wireless connections, the techniques disclosed herein may involve transmission of content over one or more wired connections through one or more wired communications media. Examples of wired communications media may include a wire, cable, metal leads, printed circuit board (PCB), backplane, switch fabric, semiconductor material, twisted-pair wire, co-axial cable, fiber optics, and so forth. The embodiments are not limited in this context.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments may be practiced without these specific details. In other instances, well known structures and devices are shown in block diagram form in order to facilitate a description thereof. The intention is to cover all modifications, equivalents, and alternatives consistent with the claimed subject matter.

FIG. 1 illustrates an embodiment of a communications environment 100 such as may be representative of a communications environment in which an energy-savings management algorithm may be implemented according to various embodiments. As shown in FIG. 1, example communications environment 100 comprises mobile device interface nodes 102, 103, and 104, mobile devices 106, 108, 110, and 112, device tracking node 150, and network management node 151. Mobile device interface node 102 may comprise a device communicating according to a particular wireless communications standard and operable to communicate directly with one or more mobile stations, handsets, user equipment devices (UEs), and/or other mobile devices. In some embodiments, for example, mobile device interface node 102 may comprise an eNodeB communicating according to an LTE standard based on the LTE Specifications discussed above and operable to communicate directly with one or more UEs. Mobile device interface node 103 may comprise a mobile device interface node communicating according to the same standard as mobile device interface node 102. For example, in embodiments in which mobile device interface node 102 comprises an eNodeB communicating according to an LTE standard, mobile device interface node 103 may also comprise an eNodeB communicating according to the same LTE standard. Mobile device interface node 104 may comprise a mobile device interface node communicating according to an alternate wireless communications standard that differs from the wireless communications standard according to which mobile device interface nodes 102 and 103 communicate. In various embodiments, the alternate wireless standard of mobile device interface node 104 may comprise a legacy standard with respect to the wireless standard of mobile device interface nodes 102 and 103. For example, in some embodiments, mobile device interface node 104 may comprise a 2G or 3G mobile device interface node, such as a GSM base station or a UMTS NodeB. The embodiments are not limited to these examples.

Device tracking node 150 may comprise a communications node that performs tracking operations for one or more mobile devices and/or mobile device interface nodes. As shown in FIG. 1, device tracking node 150 may provide tracking services for multiple mobile device interface nodes, and multiple mobile devices served by those mobile device interface nodes. In some embodiments, tracking services provided by device tracking node 150 may comprise tracking the identifications and states of mobile devices (such as mobile devices 106, 108, 110, and 112) in communications network 100, the registration of mobile devices with and service of mobile devices by mobile device interface nodes (such as mobile device interface nodes 102, 103, and 104) in communications network 100, and other tracking services. Device tracking node 150 may comprise a device tracking node for an access network operating according to a communications standard employed by the one or more mobile device interface nodes that it serves. In the example of FIG. 1, device tracking node 150 is communicatively coupled to—and provides tracking services for—mobile device interface nodes 102 and 103. In various embodiments, device tracking node 150 may comprise an LTE Mobility Management Entity (MME). The embodiments are not limited in this context.

Network management node 151 may comprise logic, programs, and/or circuitry operative to provision and/or configure device tracking node 150. In various embodiments, network management node 151 may be operative to generate and/or accumulate information describing characteristics of communications network 100, and provision and/or configure device tracking node 150 based on that information. In some embodiments, network management node 151 may obtain information describing characteristics of communications network 100 from device tracking node 150, from one or more mobile device interface nodes, such as mobile device interface nodes 102, 103, and/or 104, and/or from one or more mobile devices, such as mobile devices 106, 108, 110, and 112. In various embodiments, network management node 151 may be operative to define, store, and/or transmit an operator policy 152. Operator policy 152 may comprise one or more rules applicable to operations and/or communications performed by and/or between mobile device interface nodes 102, 103, and 104 and mobile devices 106, 108, 110, and 112 in communications system 100. The embodiments are not limited in this context.

Mobile device interface node 102 may comprise a mobile device interface node that is a candidate to be deactivated according to an energy-saving mode. A mobile device interface node may be identified as a candidate to be deactivated based on one or more energy-saving mode triggers, which may describe conditions which, when they occur, cause the mobile device interface node to be identified as a candidate to be deactivated. For example, an energy-saving mode trigger for a mobile device interface node may define a load threshold for the mobile device interface node and stipulate that when the load on the mobile device interface node falls below the load threshold, the mobile device interface node is identified as a candidate for deactivation according to an energy-saving mode. In some embodiments, for example, mobile device interface node 102 may comprise an LTE eNodeB, and an energy-saving mode trigger for mobile device interface node 102 may define a load threshold for mobile device interface node 102 and stipulate that when the load on mobile device interface node 102 falls below the load threshold, mobile device interface node 102 is identified as a candidate to be deactivated in conjunction with an inter-Radio-Access-Technology Energy Savings Management (inter-RAT ESM) mode according to the LTE Specifications. In various embodiments, one or more energy-saving mode triggers may be defined in operator policy 152. In some embodiments, the identification of a mobile device interface node as a candidate to be deactivated according to an energy-saving mode may depend on other factors, such as a time of day, one or more statistics describing historical load characteristics, or one or more statistics describing predicted future load characteristics. The embodiments are not limited to these examples.

Mobile devices 106, 108, 110, and 112 may comprise mobile devices that are served by mobile device interface node 102, and that are capable of communicating according to the wireless communications standard of mobile device interface node 102. For example, in embodiments in which mobile device interface node 102 comprises an eNodeB that communicates according to an LTE standard, mobile devices 106, 108, 110, and 112 may comprise mobile devices that are capable of communicating according to the LTE standard and that are served by mobile device interface node 102. In some embodiments, one or more of mobile devices 106, 108, 110, and 112 may be registered with one or more other mobile device interface nodes by which they are not served, at the same time that they are served by mobile device interface node 102. For example, in various embodiments, mobile device 106 may be registered with and served by mobile device interface node 102, and also registered with but not served by mobile device interface node 104. The embodiments are not limited to this example.

Mobile devices 106 and 108 may comprise mobile devices that are in an idle mode. With respect to a mobile device, an idle mode may comprise a state in which the mobile device may periodically exchange control information with a mobile device interface node—over a control channel, for example—but may not be actively engaged in voice and/or data communications. As used herein to describe a mobile device, the term "idle" may denote that the mobile device is in an idle mode. In some embodiments, an idle mode may comprise an idle mode according to the LTE Specifications. In various embodiments, mobile devices 106 and 108 may comprise mobile devices that are in an LTE idle mode and served by mobile device interface node 102. The embodiments are not limited in this context.

Deactivating the serving mobile device interface node of an idle mobile device that is registered only with its serving mobile device interface node may cause a service discontinuity for that mobile device. Such a service discontinuity may occur because following the deactivation of the serving mobile device interface node, the idle mobile device may need to identify and/or register with an alternate mobile device interface node before it can properly address and/or receive control transmissions. However, in some communications networks such as may be represented by communications network 100, some idle mobile devices may be able to enter a reduced-signaling idle state that allows them to simultaneously register with more than one mobile device interface node. For example, in an LTE network, some idle mobile devices may be able to enter an Idle-mode Signaling Reduction (ISR) state in which they are simultaneously registered with an LTE eNodeB and a GSM base station or UMTS NodeB. The ability of a mobile device to enter a reduced-signaling idle state and thus maintain registry with multiple mobile device interface nodes simultaneously may be leveraged by the network to provide effectively continuous service to the idle mobile device in the event that its serving mobile device interface node is deactivated.

In various such communications networks, a particular idle mobile device may be in a reduced-signaling idle state, may be registered with and served by a mobile device interface node operating according to a communications standard native to a device tracking node such as device tracking node 150, and also registered with a mobile device interface node operating according to an alternate standard. For example, a capable mobile device in a 4G network such as an LTE network may be served by and registered with a 4G mobile device interface node such as an LTE eNodeB, and also registered with a 2G or 3G mobile device interface node, such as a GSM base station or a UMTS NodeB. The ability of such an example idle mobile device to be registered with an alternate-standard mobile device interface node at the same time that it is served by and registered with its serving mobile device interface node may allow the idle mobile device to avoid a service discontinuity by obtaining service from the 2G or 3G mobile device interface node with which it is registered when service from the 4G mobile device interface node becomes unavailable. The embodiments are not limited to this example.

Mobile device 106 may comprise a sustainable idle mobile device. As used herein to describe an idle mobile device, the term "sustainable" may denote that the idle mobile device is capable of realizing effectively continuous service in the event that a mobile device interface node by which it is currently served is deactivated. In some embodiments, a mobile device may comprise a sustainable mobile device when it is capable of realizing effectively continuous service by obtaining service from an alternate mobile device interface node with which it is registered. Such an alternate mobile device interface node may operate according to an alternate wireless communications standard.

Factors that may affect whether an idle mobile device is sustainable may include whether the mobile device is within range of an alternate-standard mobile device interface node, whether one or more communications channels are available and sufficiently free of interference such that the mobile device is able to use them to communicate with the alternate-standard mobile device interface node, whether the mobile device is capable of communicating according to the alternate standard of the alternate-standard mobile device interface node, and whether the mobile device is registered with the alternate-standard mobile device interface node. In an example embodiment in which mobile device 106 comprises a sustainable idle mobile device, mobile device interface node 104 may comprise an alternate-standard mobile device interface node operating according to a 2G or 3G standard such as GSM or UMTS, and mobile device 106 may be within range of mobile device interface node 104, have access to useable communications channels by which to communicate with mobile device interface node 104, and be registered with mobile device interface node 104. The embodiments are not limited to this example.

Mobile device 108 may comprise a non-sustainable idle mobile device. As used herein to describe an idle mobile device, the term "non-sustainable" may denote that the idle mobile device is incapable of realizing effectively continuous service in the event that a mobile device interface node by which it is currently served is deactivated. A number of factors may affect whether an idle mobile device is non-sustainable. For example, an idle mobile device may be non-sustainable if it is not registered with an alternate-standard mobile device interface node, if it is incapable of communicating according to the alternate standard of any alternate-standard mobile device interface node within range, if no clear and available communications channels are available by which it may communicate with an alternate-standard mobile device interface node, or based on other factors. In one such example, mobile device 108 may comprise an "LTE only" mobile device, and may constitute a non-sustainable idle mobile device because it is not capable of communicating according to a GSM or UMTS standard employed by mobile device interface node 104. The embodiments are not limited to this example.

It is worthy of note that because some factors that affect whether an idle mobile device is sustainable may comprise potentially time-varying conditions—such as, for example, the position of the mobile device with respect to alternate-standard mobile device interface nodes, the availability of communications channels, and the existence of interference—it is possible for an idle mobile device to switch between a sustainable state and a non-sustainable state. For example, an idle mobile device that is non-sustainable at time $T_1$ because it is not within range of an alternate-standard mobile device interface node may subsequently move within range of an alternate-standard mobile device interface node and become sustainable at time $T_2$. The embodiments are not limited to this example.

Mobile devices 110 and 112 may comprise mobile devices that are in a connected mode. With respect to a mobile device, a connected mode may comprise a state in which the mobile device may be actively engaged in voice and/or data communications. As used herein to describe a mobile device, the term "connected" may denote that the mobile device is in a connected mode. In various embodiments, a connected mode may comprise a connected mode according to the LTE Specifications. In some embodiments, mobile devices 110 and 112 may comprise mobile devices that are in an LTE connected mode and served by mobile device interface node 102. The embodiments are not limited in this context.

Mobile device 110 may comprise a transferable connected mobile device. As used herein to describe a connected mobile device, the term "transferable" may denote that voice and/or data communications in which the connected mobile device is engaged are capable of being handed off from a mobile device interface node by which the connected mobile device is served to a different mobile device interface node. Factors that may affect whether a connected mobile device is transferable may include whether the mobile device is within range of any mobile device interface nodes other than that by which the mobile device is served, whether one or more communications channels are available and sufficiently free of interference such that the mobile device is able to use them to communicate with any such other mobile device interface node, and whether the mobile device is capable of communicating according to the wireless communications standard employed by any such other mobile device interface node. It is worthy of note that the mobile device interface node to which the voice and/or data communications may be transferred need not necessarily operate in accordance with the same wireless standard as that from which they may be transferred in order for the mobile device conducting the voice and/or data communications to constitute a transferable connected mobile device. For example, in various embodiments, mobile device 110 may comprise a transferable connected mobile device if voice and/or data communications in which mobile device 110 is engaged are capable of being handed off from mobile device interface node 102 to mobile device interface node 104, despite the fact that mobile device interface node 104 operates according to the alternate standard. The embodiments are not limited to this example.

Mobile device 112 may comprise a non-transferable connected mobile device. As used herein to describe a connected mobile device, the term "non-transferable" may denote that voice and/or data communications in which the connected mobile device is engaged are capable of being handed off from a mobile device interface node by which the connected mobile device is served to a different mobile device interface node. A number of factors may affect whether a connected mobile device is non-transferable. For example, a connected mobile device may be non-transferable if it is not within range of any mobile device interface node other than that by which it is served, if no communications channels are available and sufficiently free of interference such that the mobile device is able to use them to communicate with any such other mobile device interface node, if no such other mobile device interface node communicates according to a standard with which the mobile device is compatible, or based on other factors. For example, in some embodiments, mobile device 112 may comprise an LTE-only mobile device, mobile device interface nodes 102 and 103 may comprise LTE eNodeBs, mobile device interface node 104 may comprise a GSM base station or a UMTS NodeB, and mobile device 112 may be out of communication range of mobile device interface node 103. In such an example embodiment, it may not be possible to hand off voice and/or data communications of mobile device 112 from mobile device interface node 102 to mobile device interface node 103, because mobile device 112 is not within range of mobile device interface node 103, and it may not be possible to hand off such voice and/or data communication from mobile device interface node 102 to mobile device interface node 104, because mobile device 112 is not compatible with the wireless communications standard employed by mobile device interface node 104. Thus, in such an example embodiment, mobile device 112 may comprise a non-transferable connected mobile device. The embodiments are not limited to this example.

It is worthy of note that although the communications between mobile device interface nodes 102 and 103, device tracking node 150, and network management node 151 are illustrated with solid lines in FIG. 1 to indicate wired communications such as those conducted over a wired backhaul, this is merely an example implementation, and the embodiments are not limited in this context. In various embodiments, communications between mobile device interface nodes 102 and/or 103, device tracking node 150, and/or network management node 151 may be conducted over one or more wired media, one or more wireless media, or a combination of both. Furthermore, although FIG. 1 does not illustrate communications lines between alternate-standard mobile device interface node 104 and any of the other elements of FIG. 1, such communications lines are omitted merely in the interest of clarity. Mobile device interface node 104 may communicate with mobile device interface nodes 102 and/or 103, device tracking node 150, and/or network management node 151 over one or more wired media, one or more wireless media, or a combination of both. The embodiments are not limited in this context.

Figure 2:
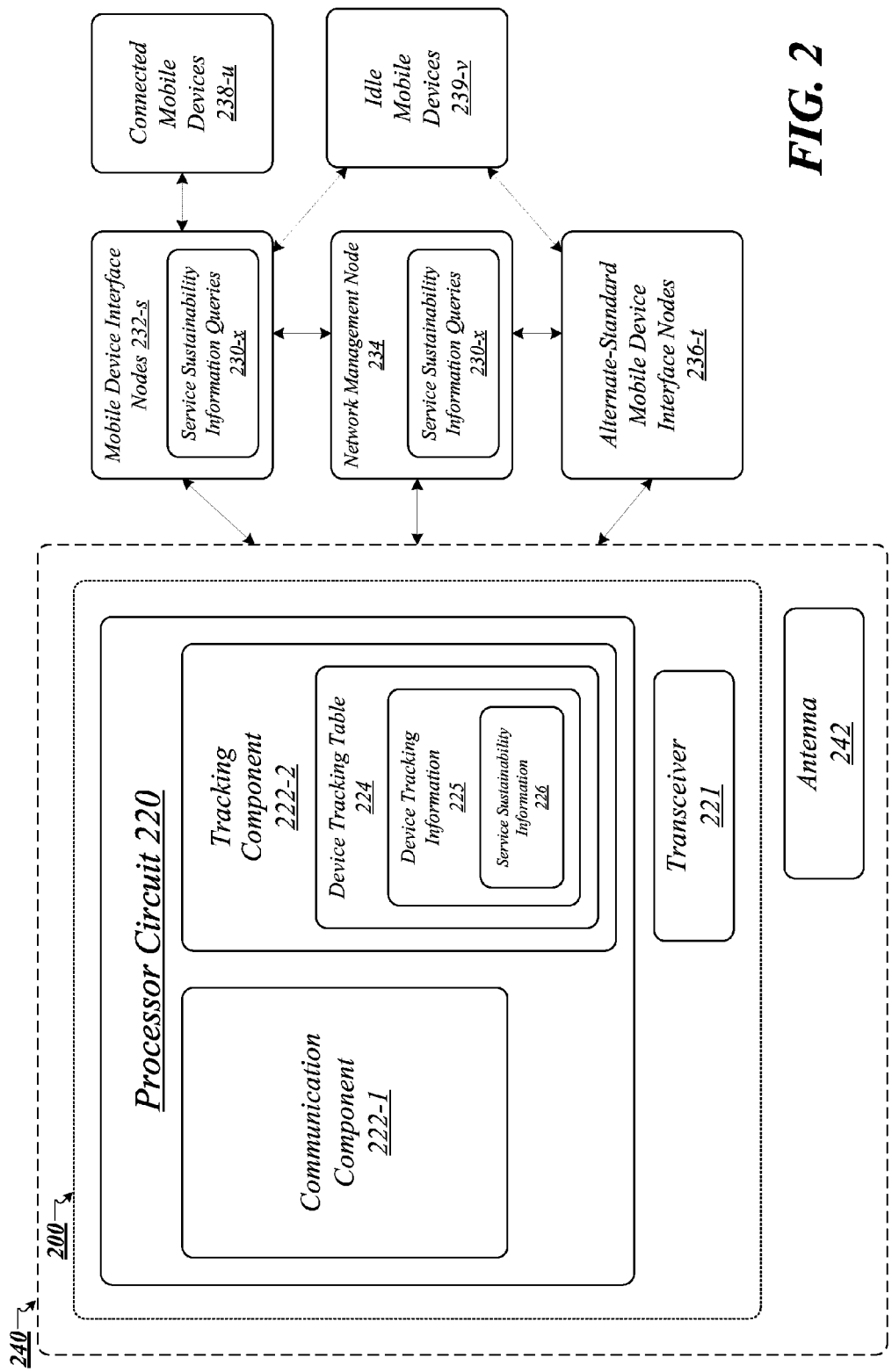
FIG. 2 illustrates an embodiment of a first apparatus and an embodiment of a first system.

FIG. 2 illustrates one embodiment of a first apparatus 200 such as may be utilized in the implementation of an energy-savings management algorithm in a communications environment such as that illustrated in FIG. 1. Apparatus 200 may comprise an example of a device tracking node 150 such as that of FIG. 1 according to some embodiments. Although the apparatus 200 shown in FIG. 2 has a limited number of elements in a certain topology, it may be appreciated that the apparatus 200 may include more or less elements in alternate topologies as desired for a given implementation.

The apparatus 200 may comprise a computer-implemented apparatus 200 having a processor circuit 220 arranged to execute one or more software components 222-a. It is worthy to note that "a" and "b" and "c" and similar designators as used herein are intended to be variables representing any positive integer. Thus, for example, if an implementation sets a value for a=5, then a complete set of software components 222-a may include components 222-1, 222-2, 222-3, 222-4 and 222-5. The embodiments are not limited in this context.

In various embodiments, the apparatus 200 may be implemented in a fixed device. A fixed device generally refers to an electronic device designed to be in a fixed, stationary, permanent or otherwise non-moving position or location that does not vary over time. For instance, a fixed device may be installed with fixtures, attachments and housings to prohibit movement, including wired power lines, transmission lines, and so forth. It may be appreciated that although a fixed device is generally stationary, some fixed devices may be disconnected from their current equipment in a first fixed location, moved to a second fixed location, and connected to equipment at the second fixed location. In some other embodiments, the apparatus 200 may be implemented as a mobile device. A mobile device is designed to be portable enough to be frequently moved between various locations over time. In various embodiments, the apparatus 200 may be implemented in any fixed or mobile electronic device having wireless and/or wired communications capabilities or equipment and compliant with one or more wired and/or wireless communications standards. For example, in one embodiment, the apparatus may comprise a mobile communications device compliant with one or more 3GPP LTE Specifications or IEEE 802.16 Standards. The embodiments are not limited in this context.

The apparatus 200 may comprise the processor circuit 220. The processor circuit 220 may be generally arranged to execute one or more software components 222-a. The processing circuit 220 may be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Core i3, Core i5, Core i7, Itanium®, Pentium®, Xeon®, and XScale® processors; and similar processors. Dual microprocessors, multi-core processors, and other multi-processor architectures may also be employed as the processing unit 220.

In various embodiments, apparatus 200 may comprise a transceiver 221. Transceiver 221 may include one or more radios capable of transmitting and receiving signals using various suitable wireless communications techniques. Such techniques may involve communications across one or more wireless networks. In communicating across such networks, transceiver 221 may operate in accordance with one or more mobile broadband communications standards such as may be implemented by mobile device interface nodes 102, 103, and/or 104, and/or mobile devices 106, 108, 110, and/or 112 in the communications environment of FIG. 1. The embodiments are not limited in this context.

The apparatus 200 may comprise a communications component 222-1. In some embodiments, communications component 222-1 may be arranged for execution by the processor circuit 220 to communicate with one or more communications devices, such as, for example, mobile device interface nodes, mobile devices, device tracking nodes, and/or network management nodes. In various such embodiments, communications component 222-1 may be operative to receive and/or transmit one or more transmissions comprising device tracking information 225 describing the states of one or more mobile devices, mobile device interface nodes, device tracking nodes, and/or network management nodes. Device tracking information 225 pertaining to a particular mobile device may comprise, for example, information describing the capabilities, location, connective—e.g., idle mode or connected mode—status, and/or identification of that mobile device. In an example embodiment with respect to FIG. 1, device tracking information 225 may comprise information indicating that mobile device 106 has an identification of "UE #1," is served by mobile device interface node 102, and is in an idle mode. In some embodiments, communications component 222-1 may be operative on transceiver 221 to receive and/or transmit device tracking information 225. The embodiments are not limited to these examples.

In various embodiments, device tracking information 225 may be useable to generate service sustainability information 226. Service sustainability information 226 may comprise information identifying one or mobile devices served by one or more mobile device interface nodes and/or indicating whether such mobile devices may experience service discontinuities if their respective serving mobile device interface nodes are deactivated according to an energy-saving mode. In some embodiments, service sustainability information 226 may comprise information indicating—or useable to determine—whether one or more mobile devices served by a mobile device interface node comprise sustainable idle mobile devices, non-sustainable idle mobile devices, transferable connected mobile devices, and/or non-transferable connected mobile devices. In an example embodiment, service sustainability information 226 may indicate that mobile device 106 of FIG. 1 is idle and served by mobile device interface node 102, and also registered with alternate-standard mobile device interface node 104, and is thus a sustainable mobile device. In this example embodiment, service sustainability information 226 may also indicate that mobile device 108 of FIG. 1 is idle and served by mobile device interface node 102, but not registered with any alternate-standard mobile device interface node, and is thus a non-sustainable mobile device. The embodiments are not limited to these examples.

The apparatus 200 may comprise a tracking component 222-2. In various embodiments, tracking component 222-2 may be arranged for execution by the processor circuit 220 to receive, organize, process, and/or store device tracking information 225. In some embodiments, tracking component 222-2 may maintain a device tracking table 224 in which device tracking information 225 is accumulated. In various embodiments, tracking component 222-2 may be operative to receive, organize, process, and/or store device tracking information 225 pertaining to the particular mobile devices that are served by one or more particular mobile device interface nodes. In an example embodiment with respect to FIG. 1, tracking component 222-2 may be operative to receive, organize, process, and/or store device tracking information 225 that pertains to mobile devices 106, 108, 110, and 112, each of which is served by mobile device interface node 102. The embodiments are not limited to this example.

FIG. 2 may also illustrate one embodiment of a first system 240. System 240 may comprise apparatus 200 and antenna 242. Antenna 242 may comprise an internal antenna, an external antenna, a monopole antenna, a meandered monopole antenna, a dipole antenna, a balanced antenna, a printed helical antenna, a chip antenna, a ceramic antenna, a planar inverted-F antenna (PIFA), a helical antenna, an end fed antenna, an omni-directional antenna, a circularly polarized antenna, a micro-strip antenna, a diversity antenna, a dual antenna, an antenna array, and others In some embodiments, system 240 may be operative to receive and/or transmit device tracking information 225 using transceiver 226 and antenna 242. The embodiments are not limited in this context.

Various components of apparatus 200 and/or system 240 may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces. The embodiments are not limited in this context.

Apparatus 200 and/or system 240 may be generally operative to receive, update, and/or accumulate device tracking information 225 and/or service sustainability information 226 and transmit service sustainability information 226 to one or more mobile device interface nodes, device tracking nodes, and/or network management nodes in conjunction with implementation of an energy-savings management algorithm. In various embodiments, for example, communications component 222-1 may receive device tracking information 225 from one or more mobile device interface nodes 232-s, from network management node 234, and/or from one or more alternate-standard mobile device interface nodes 236-t, via transceiver 221. In some embodiments, device tracking information may comprise information describing the capabilities, location, idle or connected mode status, and/or identification of one or more connected mobile devices 238-u and/or one or more idle mobile devices 239-v served by and/or registered with one or more mobile device interface nodes 232-s and/or one or more alternate-standard mobile device interface nodes 236-t. In various embodiments, apparatus 200 and/or system 240 may comprise a 4G device tracking node, such as an LTE MME. In some such embodiments, mobile device interface nodes 232-s may comprise one or more 4G mobile device interface nodes, such as LTE eNodeBs, and alternate-standard mobile device interface nodes 236-t may comprise one or more 2G or 3G mobile device interface nodes, such as a GSM base station or a UMTS NodeB. The embodiments are not limited in this context.

In various embodiments, tracking component 222-2 may be operative to receive device tracking information 225 useable to determine whether one or more idle mobile devices 239-v served by a mobile device interface node 232-s comprise sustainable idle mobile devices or non-sustainable idle mobile devices. In some such embodiments, device tracking information 225 may comprise information indicating or useable to determine whether one or more idle mobile devices 239-v served by a mobile device interface node 232-s are also registered with an alternate-standard mobile device interface node 236-t. More particularly, in various embodiments, device tracking information 225 may comprise information indicating—or useable to determine—whether one or more idle mobile devices 239-v served by a mobile device interface node 232-s are in a reduced-signaling idle state, which in turn may be useable to determine whether the one or more idle mobile devices 239-v are also registered with an alternate-standard mobile device interface node 236-t. For example, in some embodiments in which a mobile device interface node 232-s comprises an LTE eNodeB, device tracking information 225 may comprise information indicating that one or more idle mobile devices 239-v that are served by mobile device interface node 232-s are in an Idle-Mode Signaling Reduction (ISR) state, which in turn may be useable to determine that the one or more idle mobile devices 239-v are also registered with one or more alternate-standard mobile device interface nodes 236-t and are thus sustainable idle mobile devices. The embodiments are not limited to this example.

In various embodiments, tracking component 222-2 may be operative to receive device tracking information 225 indicating whether one or more idle mobile devices 239-v served by a mobile device interface node 232-s are transmitting control messages that are consistent with a reduced-signaling idle state. This information may be useable to determine whether the one or more idle mobile devices 239-v are in the reduced-signaling idle state, which in turn may indicate whether the one or more idle mobile devices 239-v are registered with one or more alternate-standard mobile device interface nodes 236-t. For example, in example embodiment comprising an LTE network, idle mobile devices 239-v that are in an ISR active state may transmit Tracking Area Updates (TAUs) to their associated MMEs and transmit Routing Area Updates to associated alternate-standard device tracking nodes such as—for example—Serving General Packet Radio Service Support Nodes (SGSNs). In such an example embodiment, device tracking information 225 may comprise information indicating whether one or more idle mobile devices 239-v are transmitting TAUs and/or RAUs. This information may be useable to determine whether the one or more idle mobile devices 239-v are in an ISR active state or an ISR inactive state. For example, device tracking information 225 that indicates that an idle mobile device 239-v is transmitting TAUs but not transmitting RAUs may be useable to determine that the idle mobile device 239-v is in an ISR inactive state. This determination may be used in turn to determine that the idle mobile device 239-v is not registered with an alternate-standard mobile device interface node 236-t, and thus that it is a non-sustainable idle mobile device. The embodiments are not limited to this example.

In some embodiments, tracking component 222-2 may be operative to receive device tracking information 225 useable to determine whether one or more connected mobile devices 238-u served by a mobile device interface node 232-s comprise transferable connected mobile devices or non-transferable connected mobile devices. In various such embodiments, such device tracking information 225 may indicate that it will or will not be possible to hand one or more connected mobile devices 238-u off to one or more mobile device interface nodes 232-s and/or alternate-standard mobile device interface nodes 236-t. For example, device tracking information may indicate that a connected mobile device 238-u is within range of only the mobile device interface node 232-s by which it is served and not within range of any other mobile device interface node 232-s or alternate-standard mobile device interface node 236-t, that it therefore will not be possible to hand the connected mobile device 238-u off to any mobile device interface node 232-s and/or alternate-standard mobile device interface node 236-t, and thus that the mobile device 238-u is a non-transferable connected mobile device. In other embodiments, device tracking information 225 may indicate that one or more attempts to hand off one or more connected mobile devices 238-u to one or more mobile device interface nodes 232-s and/or alternate-standard mobile device interface nodes 236-t have been successful and/or unsuccessful. For example, device tracking information may indicate that an attempt to hand a connected mobile device 238-u off from a mobile device interface node 232-s to a different mobile device interface node 232-s has been successful. The embodiments are not limited to these examples.

As noted above, in some embodiments, tracking component 222-2 may be operative to store device tracking information 225 in a device tracking table 224. FIG. 3A illustrates an embodiment 300 of a device tracking table such as may be representative of a device tracking table 224 in FIG. 2 according to various embodiments. As shown in FIG. 3A, device tracking table 300 may comprise entries 301, 303, 305, 307, and 309. Each of entries 301, 303, 305, 307, and 309 may comprise a mobile device identification (ID) that identifies a particular mobile device. Each of entries 301, 303, 305, 307, and 309 may also comprise respective tracking information 302, 304, 306, 308, and 310, which may describe capabilities, locations, idle or connected mode statuses, and/or other characteristics of mobile devices corresponding to the respective mobile device IDs MD-A, MD-B, MD-C, MD-D, and MD-E. For example, entry 301 may comprise the mobile device ID MD-A and tracking information 302 describing capabilities, locations, idle or connected mode status, and/or other characteristics of a mobile device corresponding to mobile device ID MD-A. The embodiments are not limited to this example.

FIG. 3B illustrates a second embodiment 320 of a device tracking table such as may be representative of a device tracking table 224 in FIG. 2 according to some embodiments. As shown in FIG. 3B, device tracking table 320 may comprise entries 321, 323, 325, 327, and 329. Each of entries 321, 323, 325, 327, and 329 may comprise a mobile device ID that identifies a particular mobile device, a mode of the mobile device, a serving mobile device interface node (MDIN) ID that identifies a mobile device interface node that serves that mobile device, and a reduced-signaling (RS) value that indicates whether a reduced-signaling state for that mobile device is active or inactive. For example, entry 321 may comprise the mobile device ID MD-A, and indicate that a mobile device corresponding to mobile device ID MD-A is in an idle mode, is served by a mobile device interface node corresponding to mobile device interface node ID MDIN #1, and is in an reduced-signaling active state. In various embodiments, such a reduced-signaling active state may comprise an ISR active state. The embodiments are not limited to this example.

FIG. 3C illustrates a third embodiment 340 of a device tracking table such as may be representative of a device tracking table 224 in FIG. 2 according to various embodiments. As shown in FIG. 3C, device tracking table 340 may comprise entries 341, 343, and 345. Each of entries 341, 343, and 345 may comprise a mobile device ID that identifies a particular mobile device, a mode of the mobile device, a serving mobile device interface node (MDIN) ID that identifies a mobile device interface node that serves that mobile device, and a handoff condition value that indicates whether a handoff of the mobile device is possible or not possible. For example, entry 341 may comprise the mobile device ID MD-F, and indicate that a mobile device corresponding to mobile device ID MD-F is in a connected mode and served by a mobile device interface node corresponding to mobile device interface node ID MDIN #1, and that a handoff of that mobile device is possible. The embodiments are not limited to this example.

Returning to FIG. 2, in some such embodiments, storing device tracking information 225 may comprise modifying, deleting, or adding to device tracking information 225 previously stored in device tracking table 224. For example, with respect to device tracking table 300 of FIG. 3, storing device tracking information 225 may comprise, for example, modifying entry 301, adding entry 303, and/or deleting entry 305. Whether tracking component 222-2 is operative to add, modify, and/or delete one or more entries in device tracking table 224 based on received device tracking information 225 may depend on the characteristics of a mobile device to which the device tracking information 225 corresponds. For example, if the device tracking information 225 pertains to a mobile device that has only recently entered a region serviced by mobile device interface nodes 232-s and registered with one of mobile device interface nodes 232-s, and thus for which no corresponding entry exists in device tracking table 224, tracking component 222-2 may be operative to store the device tracking information 225 in device tracking table 224 by adding an entry corresponding to that mobile device. In another example, if the device tracking information 225 pertains to a mobile device that is registered with one of mobile device interface nodes 232-s and for a corresponding entry does exist in device tracking table 224, tracking component 222-2 may be operative to store the device tracking information 225 in device tracking table 224 by modifying the existing entry corresponding to that mobile device. In yet another example, if the device tracking information 225 pertains to a mobile device that has exited a region serviced by mobile device interface nodes 232-s and is not registered with any of mobile device interface nodes 232-s, tracking component 222-2 may be operative to store device tracking information 225 indicating this fact by deleting an existing entry in device tracking table 224 that corresponds to that departed mobile device. The embodiments are not limited to these examples.

In various embodiments in which apparatus 200 and/or system 240 comprises a device tracking node such as an MME in an LTE network, tracking component 222-2 may be operative to receive device tracking information 225 indicating whether one or more idle mobile devices 239-v are transmitting TAUs and/or RAUs, and may add, modify, and/or delete one or more entries in device tracking table 224 based on this device tracking information 225. In an example embodiment, device tracking information 225 may comprise information indicating that an idle mobile device 239-v is transmitting both TAUs and RAUs, which may in turn indicate that the idle mobile device 239-v is registered with both a mobile device interface node 232-s and an alternate-standard mobile device interface node 236-t, and is thus in an active ISR state. Based on this device tracking information 225, if an entry in device tracking table 224 indicates that the idle mobile device 239-v is in an inactive ISR state, tracking component 222-2 may be operative to modify that entry to indicate that the idle mobile device 239-v is in the active ISR state.

In another example embodiment, device tracking information 225 may comprise information indicating that a TAU is received from an idle mobile device 239-v before the expiration of a TAU timer, but that no RAU is received from the idle mobile device 239-v before the expiration of a RAU timer. This may in turn indicate that the idle mobile device 239-v is registered with a mobile device interface node 232-s but is not registered with any alternate-standard mobile device interface node 236-t, and is thus in an ISR inactive state. Based on this device tracking information 225, if an entry in device tracking table 224 indicates that the idle mobile device 239-v is in an ISR active state, tracking component 222-2 may be operative to modify that entry to indicate that the idle mobile device 239-v is in the ISR inactive state.

In another example embodiment, device tracking information 225 may comprise information indicating that a TAU is received from an idle mobile device 239-v before the expiration of a TAU timer, which in turn indicates that the idle mobile device 239-v is served by a particular mobile device interface node 232-s. Based on this device tracking information 225, if an entry in device tracking table 224 indicates that the idle mobile device 239-v is served by a different mobile device interface node 232-s, tracking component 222-2 may be operative to modify that entry to indicate that the idle mobile device 239-v is served by the particular mobile device interface node 232-s that is identified in the TAU.

In another example embodiment, device tracking information 225 may comprise information indicating that a TAU has been transmitted by an idle mobile device 239-v for which no corresponding entry exists in device tracking table 224, which may in turn indicate that the idle mobile device 239-v has recently entered a coverage area corresponding to apparatus and/or system 240. Based on this device tracking information 225, tracking component 222-2 may be operative to add an entry corresponding to the idle mobile device 239-v to device tracking table 224. In such an example embodiment, tracking component 222-2 may be operative to add an entry to device tracking table 224 that indicates that idle mobile device is served by a particular mobile device interface node 232-s and that it is in an inactive ISR state.

In another example embodiment, device tracking information 225 may comprise information indicating that a TAU is not received from an idle mobile device 239-v before a TAU timer expires, which may in turn indicate that the idle mobile device 239-v has powered off or moved outside a coverage area corresponding to apparatus 200 and/or system 240. Based on this device tracking information 225, tracking component 222-2 may be operative to delete an entry corresponding to the idle mobile device 239-v from device tracking table 224. The embodiments are not limited to these examples.

In some embodiments, communications component 222-1 may be operative to receive one or more service sustainability information queries 230-x from one or more mobile device interface nodes 232-s and/or from network management node 234. Service sustainability information queries 230-x may comprise requests for information indicating whether one or more idle mobile devices 239-v and/or one or more connected mobile devices 238-u that are served by a mobile device interface node 232-s will experience service interruption in the event that the mobile device interface node 232-s is deactivated according to an energy-saving mode. In various embodiments, service sustainability information queries 230-x may comprise requests for information indicating whether one or more idle mobile devices 239-v served by mobile device interface node 232-s comprise sustainable idle mobile devices or non-sustainable idle mobile devices, and/or whether one or more connected mobile devices 238-u served by mobile device interface node 232-s comprise transferable connected mobile devices or non-transferable connected mobile devices. The embodiments are not limited in this context.

In some embodiments, tracking component 222-2 may be operative to generate—based on device tracking information 225, and in response to one or more service sustainability information queries 230-x—service sustainability information 226 for transmission by communications component 222-1 to one or more mobile device interface nodes 232-s and/or to network management node 234. Service sustainability information 226 may comprise information indicating whether one or more idle mobile devices 239-v and/or one or more connected mobile devices 238-u that are served by a mobile device interface node 232-s will experience service interruption in the event that the mobile device interface node 232-s is deactivated according to an energy-saving mode. In various embodiments, service sustainability information 226 may comprise information indicating whether one or more idle mobile devices 239-v served by mobile device interface node 232-s comprise sustainable idle mobile devices or non-sustainable idle mobile devices, and/or whether one or more connected mobile devices 238-u served by mobile device interface node 232-s comprise transferable connected mobile devices or non-transferable connected mobile devices. The embodiments are not limited in this context.

In some embodiments, service sustainability information 226 may comprise a non-sustainable idle device count for a mobile device interface node 232-s. A non-sustainable idle device count for a mobile device interface node 232-s may indicate a number of idle mobile devices 239-v served by the mobile device interface node 232-s that are non-sustainable idle devices. In various embodiments, service sustainability information 226 may comprise a non-transferable connected device count for a mobile device interface node 232-s. A non-transferrable connected device count for a mobile device interface node 232-s may indicate a number of connected mobile devices 238-u served by the mobile device interface node 232-s that are non-transferable connected mobile devices. In various embodiments, one or more mobile device interface nodes 232-s and/or network management node 234 may be operative to receive service sustainability information 226 and determine a non-sustainable idle device count for a mobile device interface node 232-s based on service sustainability information 226. In various such embodiments, service sustainability information 226 may not comprise a non-sustainable idle device count, but the one or more mobile device interface nodes 232-s and/or network management node 234 may be operative to determine a non-sustainable idle device count for a mobile device interface node 232-s based on information within service sustainability information 226 describing a set of connective statuses for one or more mobile devices served by the mobile device interface node 232-s. The embodiments are not limited in this context.

In some embodiments, communications component 222-1 may be operative to transmit service sustainability information 226 to one or more mobile device interface nodes 232-s and/or network management node 234 in response to one or more service sustainability information queries 230-x received from the one or more mobile device interface nodes 232-s and/or network management node 234. In an example embodiment, communications component 222-1 may be operative to transmit to network management node 234 service sustainability information 226 comprising a non-sustainable idle device count for a mobile device interface node 232-s, in response to a service sustainability information query 230-x received from network management node 234. In such an example embodiment, if the mobile device interface node 232-s comprises an LTE eNodeB, the non-sustainable idle device count may comprise a number of idle mobile devices 239-v served by mobile device interface node 232-s that are in an inactive ISR mode. The embodiments are not limited to this example.

Included herein are one or more logic flows representative of exemplary methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on a non-transitory computer readable medium or machine readable medium, such as an optical, magnetic or semiconductor storage. The embodiments are not limited in this context.

FIG. 4 illustrates an embodiment of a logic flow 400 that may be representative of some or all of the operations executed by one or more embodiments described herein, such as apparatus 200 and/or system 240 of FIG. 2. More particularly, the logic flow 400 may be implemented by the communications component 222-1, and/or the tracking component 222-2 in apparatus 200 and/or system 240.

In the illustrated embodiment shown in FIG. 4, the logic flow 400 may begin at 402, where device tracking information may be received. For example, communications component 222-1 of FIG. 2 may receive device tracking information 225 from one or more mobile device interface nodes 232-s and/or from network management node 234. At 404, the device tracking information may be added to a device tracking table. For example, tracking component 222-2 of FIG. 2 may add device tracking information 225 to device tracking table 224. At 406, a service sustainability information query may be received. For example, communications component 222-1 of FIG. 2 may receive a service sustainability information query 230-x from a mobile device interface node 232-s or from network management node 234. At 408, service sustainability information may be generated. For example, tracking component 222-2 of FIG. 2 may generate service sustainability information 226 based on device tracking table 225 and a service sustainability information query 230-x. At 410, the service sustainability information may be transmitted. For example, communications component 222-1 of FIG. 2 may transmit service sustainability information 226 to a mobile device interface node 232-s or to network management node 234. The embodiments are not limited to these examples.

Figure 5:
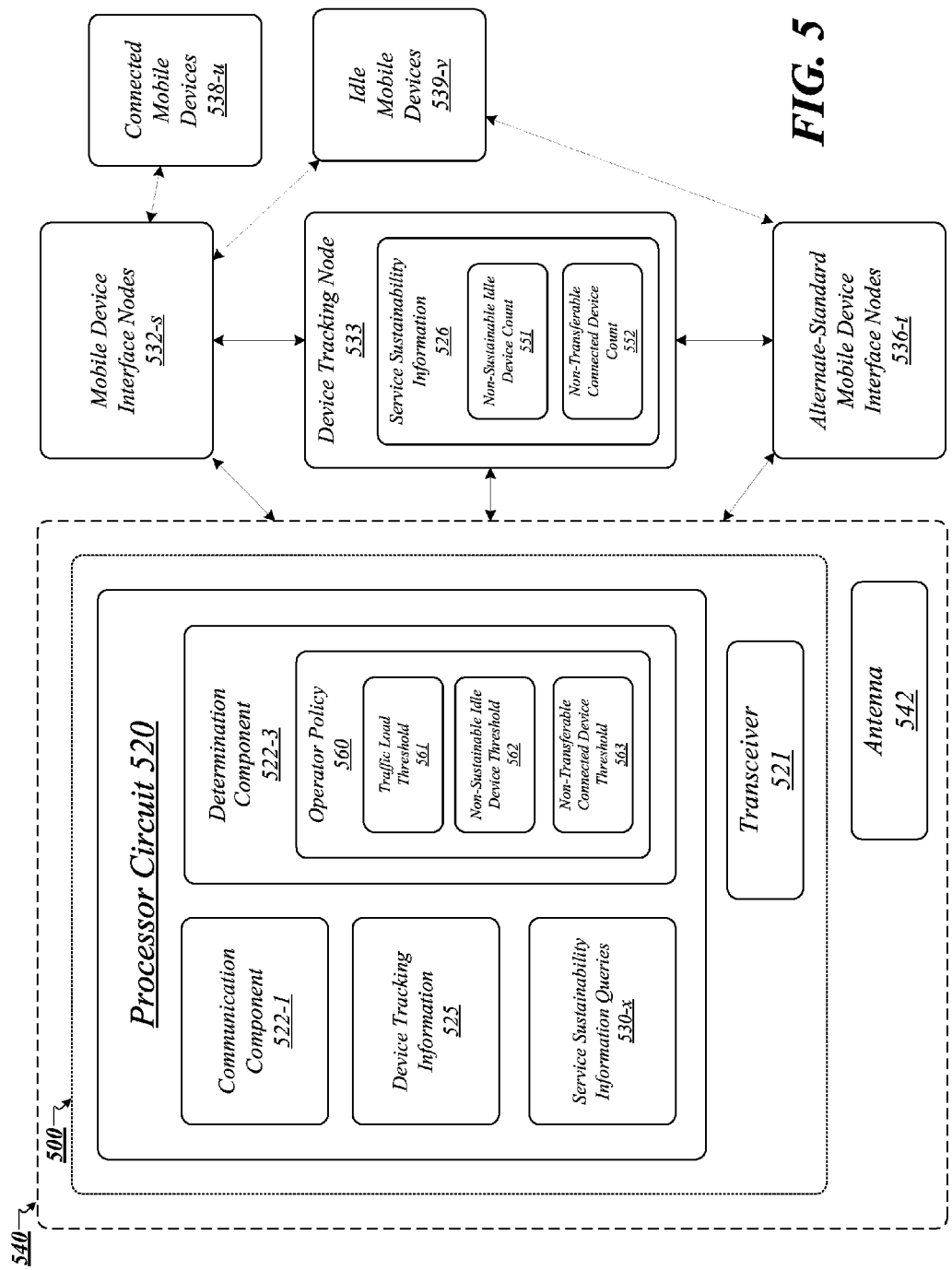
FIG. 5 illustrates an embodiment of a second apparatus and an embodiment of a second system.

FIG. 5 illustrates one embodiment of a second apparatus 500 such as may be utilized in the implementation of an energy-savings management algorithm in a communications environment such as that illustrated in FIG. 1, and/or in conjunction with apparatus 200 and/or system 240 of FIG. 2. Apparatus 500 may comprise an example of a network management node such as network management node 151 of FIG. 1 according to various embodiments. More particularly, apparatus 500 may comprise an example of a network management node that may be used to implement a centralized energy-savings management algorithm, according to which determinations regarding whether multiple mobile device interface nodes 532-s are to be deactivated according to an energy-saving mode are performed at a central network management node. In various embodiments, apparatus 500 may comprise an LTE network management node. Although the apparatus 500 shown in FIG. 5 has a limited number of elements in a certain topology, it may be appreciated that the apparatus 500 may include more or less elements in alternate topologies as desired for a given implementation.

The apparatus 500 may comprise a computer-implemented apparatus having a processor circuit 520 arranged to execute one or more software components 522-a. In some embodiments, apparatus 500 may be implemented as either a fixed device or a mobile device, as defined with respect to apparatus 200. Processer circuit may be the same as or similar to processor circuit 220 of FIG. 2. The embodiments are not limited in this context.

In various embodiments, apparatus 500 may comprise a transceiver 521. Transceiver 521 may include one or more radios capable of transmitting and receiving signals using various suitable wireless communications techniques, and may be the same as or similar to transceiver 221 of FIG. 2.

In some embodiments, apparatus 500 may comprise a communications component 522-1. In various embodiments, communications component 522-1 may be arranged for execution by the processor circuit 520 to communicate with one or more communications devices, such as, for example, mobile device interface nodes, mobile devices, device tracking nodes, and/or network management nodes. In some such embodiments, communications component 522-1 may be operative to receive and/or transmit one or more transmissions comprising device tracking information 525, service sustainability information 526, and/or service sustainability information queries 530-x. In an example embodiment, communications component 522-1 may be operative to receive service sustainability information 526 describing a set of connective statuses for one or more connected mobile devices 538-u and/or idle mobile devices 539-v served by a mobile device interface node 532-s. The embodiments are not limited in this context.

In various embodiments, apparatus 500 may comprise a determination component 522-3. Determination component 522-3 may be operative to generate one or more service sustainability information queries 530-x, to receive service sustainability information 526 in response to one or more service sustainability information queries 530-x, and/or to determine whether one or more mobile device interface nodes 532-s are to be deactivated according to an energy-saving mode. The embodiments are not limited in this context.

FIG. 5 may also illustrate one embodiment of a second system 540. System 540 may comprise apparatus 500 and antenna 542. Antenna 542 may be the same as or similar to antenna 242 of FIG. 2. In some embodiments, system 540 may be operative to receive and/or transmit device tracking information 525, service sustainability information 526, and/or service sustainability information queries 530 using transceiver 526 and antenna 542. The embodiments are not limited in this context.

Apparatus 500 and/or system 540 may be generally operative to determine whether to deactivate one or more mobile device interface nodes 532-s in conjunction with implementation of an energy-savings management algorithm. In various embodiments, determination component 522-3 may be operative to compare a traffic load of a mobile device interface node 532-s to a traffic load threshold 561. Traffic load threshold 561 may correspond to an energy-saving mode trigger in an operator policy 560 associated with the energy-savings management algorithm. In some embodiments, determination component 522-3 may determine that a traffic load of a mobile device interface node 532-s is less than traffic load threshold 561. Based on this determination, determination component 522-3 may identify the mobile device interface node 532-s as a candidate for deactivation according to the energy-saving mode. The embodiments are not limited in this context.

In various embodiments, determination component 522-3 may be operative to generate one or more service sustainability information queries 530-x, which may be transmitted to a device tracking node 533 by communications component 522-1. In some embodiments, the one or more service sustainability information queries 530-x may comprise requests for service sustainability information 526 pertaining to the mobile device interface node 532-s that has been identified as a candidate for deactivation according to the energy-saving mode. The embodiments are not limited in this context.

In various embodiments, in response to the one or more service sustainability information queries 530-x, communication component 522-1 may be operative to receive service sustainability information 526 from device tracking node 533. In some embodiments, service sustainability information 526 may comprise service sustainability information pertaining to the mobile device interface node 532-s that has been identified as a candidate for deactivation according to the energy-saving mode. In various such embodiments, the service sustainability information 526 may comprise a non-sustainable idle device count 551 and/or a non-transferable connected device count 552 for the mobile device interface node 532-s. In other such embodiments, the service sustainability information 526 may not comprise a non-sustainable idle device count 551 and/or a non-transferable connected device count 552, but may comprise information describing a set of connective statuses for one or more mobile devices served by the mobile device interface node 532-s, and useable by determination component 522-3 to determine a non-sustainable idle device count 551 and/or a non-transferable connected device count 552 for the mobile device interface node 532-s. The embodiments are not limited in this context.

In some embodiments, determination component 522-3 may be operative to receive or determine a non-sustainable idle device count 551 for a mobile device interface node 532-s and to determine whether to deactivate the mobile device interface node 532-s according to the energy-saving mode based on whether the non-sustainable idle device count 551 exceeds a non-sustainable idle device threshold 562 defined in operator policy 560. For example, in an embodiment in which determination component 522-3 determines that the non-sustainable idle device count 551 exceeds the non-sustainable idle device threshold 562, determination component 522-3 may accordingly determine that the mobile device interface node 532-s is not to enter the energy-saving mode. In various embodiments, the non-sustainable idle device count 551 for mobile device interface node 532-s may be equal to zero, indicating that mobile device interface node 532-s is not to be deactivated if any non-sustainable idle mobile devices are served by mobile device interface node 532-s. The embodiments are not limited in this context.

In some embodiments, determination component 522-3 may be operative to receive or determine a non-transferable connected device count 552 for a mobile device interface node 532-s and to determine whether to deactivate the mobile device interface node 532-s according to the energy-saving mode based on whether the non-transferable connected device count 552 exceeds a non-transferable connected device threshold 563 defined in operator policy 560. For example, in an embodiment in which determination component 522-3 determines that the non-transferable connected device count 552 for mobile device interface node 532-s exceeds the non-transferable connected device threshold 563, determination component 522-3 may accordingly determine that the mobile device interface node 532-s is not to enter the energy-saving mode. In various embodiments, the non-transferable connected device count 552 for mobile device interface node 532-s may be equal to zero, indicating that mobile device interface node 532-s is not to be deactivated if any non-transferable connected mobile devices are served by mobile device interface node 532-s. The embodiments are not limited in this context.

It is worthy of note that although the example of FIG. 5 illustrates non-transferable connected device count 552 as being obtained by apparatus 500 and/or system 540 in service sustainability information 526 received from device tracking node 533, the embodiments are not limited to this example. In some other embodiments, apparatus 500 and/or system 540 may determine non-transferable connected device count 552 based on device tracking information 525 received from one or more mobile device interface nodes 532-s, one or more connected mobile devices 538-u, and/or one or more idle mobile devices 538-v. The embodiments are not limited in this context.

Figure 6:
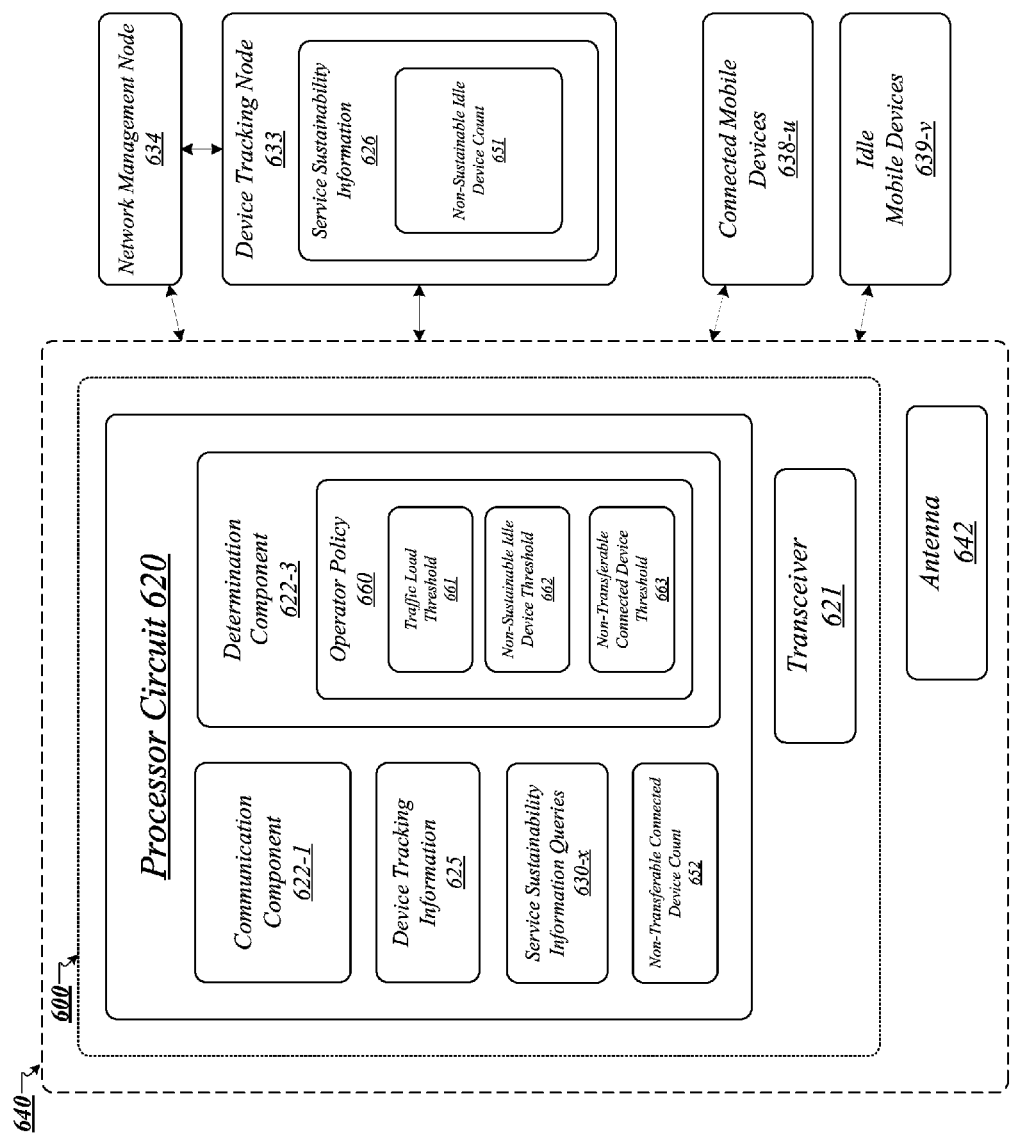
FIG. 6 illustrates an embodiment of a third apparatus and an embodiment of a third system.

FIG. 6 may illustrate one embodiment of a third apparatus 600 such as may be utilized in the implementation of an energy-savings management algorithm in a communications environment such as that illustrated in FIG. 1, and/or in conjunction with apparatus 200 and/or system 240 of FIG. 2. Apparatus 600 may comprise an example of a mobile device interface node such as mobile device interface node 102 of FIG. 1 according to various embodiments. More particularly, apparatus 600 may comprise an example of a mobile device interface node that may be used in implementation of a distributed energy-savings management algorithm, according to which determinations regarding whether each particular mobile device interface node should be deactivated according to an energy-saving mode are performed at each respective mobile device interface node. In various embodiments, apparatus 600 may comprise an eNodeB. Although the apparatus 600 shown in FIG. 6 has a limited number of elements in a certain topology, it may be appreciated that the apparatus 600 may include more or less elements in alternate topologies as desired for a given implementation.

In some embodiments, apparatus 600 may comprise a computer-implemented apparatus having a processor circuit 620 arranged to execute one or more software components 622-a. In various embodiments, apparatus 600 may be implemented as either a fixed device or a mobile device, as defined with respect to apparatus 200. Processer circuit may be the same as or similar to processor circuit 220 of FIG. 2. The embodiments are not limited in this context.

In some embodiments, apparatus 600 may comprise a transceiver 621. Transceiver 621 may include one or more radios capable of transmitting and receiving signals using various suitable wireless communications techniques, and may be the same as or similar to transceiver 221 of FIG. 2.

In various embodiments, apparatus 600 may comprise a communications component 622-1. In some embodiments, communications component 622-1 may be arranged for execution by the processor circuit 620 to communicate with one or more communications devices, such as, for example, mobile device interface nodes, mobile devices, device tracking nodes, and/or network management nodes. In various such embodiments, communications component 622-1 may be operative to receive and/or transmit one or more transmissions comprising device tracking information 625, service sustainability information 626, and/or service sustainability information queries 630-x. In an example embodiment, communications component 622-1 may be operative to receive service sustainability information 626 describing a set of connective statuses for one or more connected mobile devices 638-u and/or idle mobile devices 639-v served by a mobile device interface node 632-s. The embodiments are not limited in this context.

In some embodiments, apparatus 500 may comprise a determination component 622-3. Determination component 622-3 may be operative to generate one or more service sustainability information queries 630-x, to receive service sustainability information 626 in response to one or more service sustainability information queries 630-x, and/or to determine whether one or more mobile device interface nodes 632-s are to be deactivated according to an energy-saving mode. The embodiments are not limited in this context.

FIG. 6 may also illustrate one embodiment of a third system 640. System 640 may comprise apparatus 600 and antenna 642. Antenna 642 may be the same as or similar to antenna 242 of FIG. 2. In various embodiments, system 640 may be operative to receive and/or transmit device tracking information 625, service sustainability information 626, and/or service sustainability information queries 630 using transceiver 626 and antenna 642. The embodiments are not limited in this context.

Apparatus 600 and/or system 640 may be generally operative to determine whether to deactivate in conjunction with implementation of an energy-savings management algorithm. In some embodiments, determination component 622-3 may be operative to compare a traffic load of apparatus 600 and/or system 640 to a traffic load threshold 661. Traffic load threshold 661 may correspond to an energy-saving mode trigger in an operator policy 660 associated with the energy-savings management algorithm. In various embodiments, determination component 622-3 may determine that a traffic load of apparatus 600 and/or system 640 is less than traffic load threshold 661. Based on this determination, determination component 622-3 may identify apparatus 600 and/or system 640 as a candidate for deactivation according to the energy-saving mode.

In some embodiments, determination component 622-3 may be operative to generate one or more service sustainability information queries 630-x, which may be transmitted to a device tracking node 633 by communications component 622-1. In various embodiments, the one or more service sustainability information queries 630-x may comprise requests for service sustainability information 626 pertaining to apparatus 600 and/or system 640. The embodiments are not limited in this context.

In some embodiments, in response to the one or more service sustainability information queries 630-x, communication component 622-1 may be operative to receive service sustainability information 626 from device tracking node 633. In various embodiments, service sustainability information 626 may comprise service sustainability information pertaining to apparatus 600 and/or system 640. In some such embodiments, the service sustainability information 626 may comprise a non-sustainable idle device count 651 for apparatus 600 and/or system 640. In other such embodiments, the service sustainability information 626 may not comprise a non-sustainable idle device count 651, but may comprise information describing a set of connective statuses for one or more mobile devices served by the mobile device interface node 632-s, and useable by determination component 622-3 to determine a non-sustainable idle device count 651 for the mobile device interface node 632-s. The embodiments are not limited in this context.

In various embodiments, determination component 622-3 may be operative to receive or determine a non-sustainable idle device count 651 for a mobile device interface node 632-s and to determine whether to deactivate apparatus 600 and/or system 640 according to the energy-saving mode based on whether the non-sustainable idle device count 651 for apparatus 600 and/or system 640 exceeds a non-sustainable idle device threshold 662 defined in operator policy 660. For example, in an embodiment in which determination component 622-3 determines that the non-sustainable idle device count 651 for apparatus 600 and/or system 640 exceeds the non-sustainable idle device threshold 662, determination component 622-3 may accordingly determine that apparatus 600 and/or system 640 is not to enter the energy-saving mode. In some embodiments, the non-sustainable idle device count 651 for apparatus 600 and/or system 640 may be equal to zero, indicating that apparatus 600 and/or system 640 is not to be deactivated if any non-sustainable idle mobile devices are served by apparatus 600 and/or system 640. The embodiments are not limited in this context.

In various embodiments, determination component 622-3 may be operative to generate a non-transferable connected device count 652 for apparatus 600 and/or system 640. In some embodiments, non-transferable connected device count 652 may indicate a number of connected mobile devices 638-u that are served by apparatus 600 and/or system 640 and that cannot be handed off to other mobile device interface nodes. In various embodiments, determination component 622-3 may be operative to generate non-transferable connected device count 652 for apparatus 600 and/or system 640 after determining that non-sustainable idle device count 651 for apparatus 600 and/or system 640 does not exceed the non-sustainable idle device threshold 662. In some such embodiments, apparatus 600 and/or system 640 may be operative to attempt a handoff of one or more connected mobile devices prior to generation of the non-transferable connected device count 652 for apparatus 600 and/or system 640. Determination component 622-3 may then be operative to determine the non-transferable connected device count 652 for apparatus 600 and/or system 640 based on a number of connected mobile devices for which the handoff attempt was unsuccessful and/or not possible. The embodiments are not limited in this context.

In various embodiments, determination component 622-3 may be operative to determine whether to deactivate apparatus 600 and/or system 640 according to the energy-saving mode based on whether the non-transferable connected device count 652 for apparatus 600 and/or system 640 exceeds a non-transferable connected device threshold 663 defined in operator policy 660. For example, in an embodiment in which determination component 622-3 determines that the non-transferable connected device count 652 for apparatus 600 and/or system 640 exceeds the non-transferable connected device threshold 663, determination component 622-3 may accordingly determine that apparatus 600 and/or system 640 is not to enter the energy-saving mode. In some embodiments, the non-transferable connected device count 652 for apparatus 600 and/or system 640 may be equal to zero, indicating that apparatus 600 and/or system 640 is not to be deactivated if any non-transferable connected mobile devices are served by apparatus 600 and/or system 640. The embodiments are not limited in this context.

It is worthy of note that various components of apparatus 500, system 540, apparatus 600, and/or system 640 may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces. The embodiments are not limited in this context.

Figure 7:
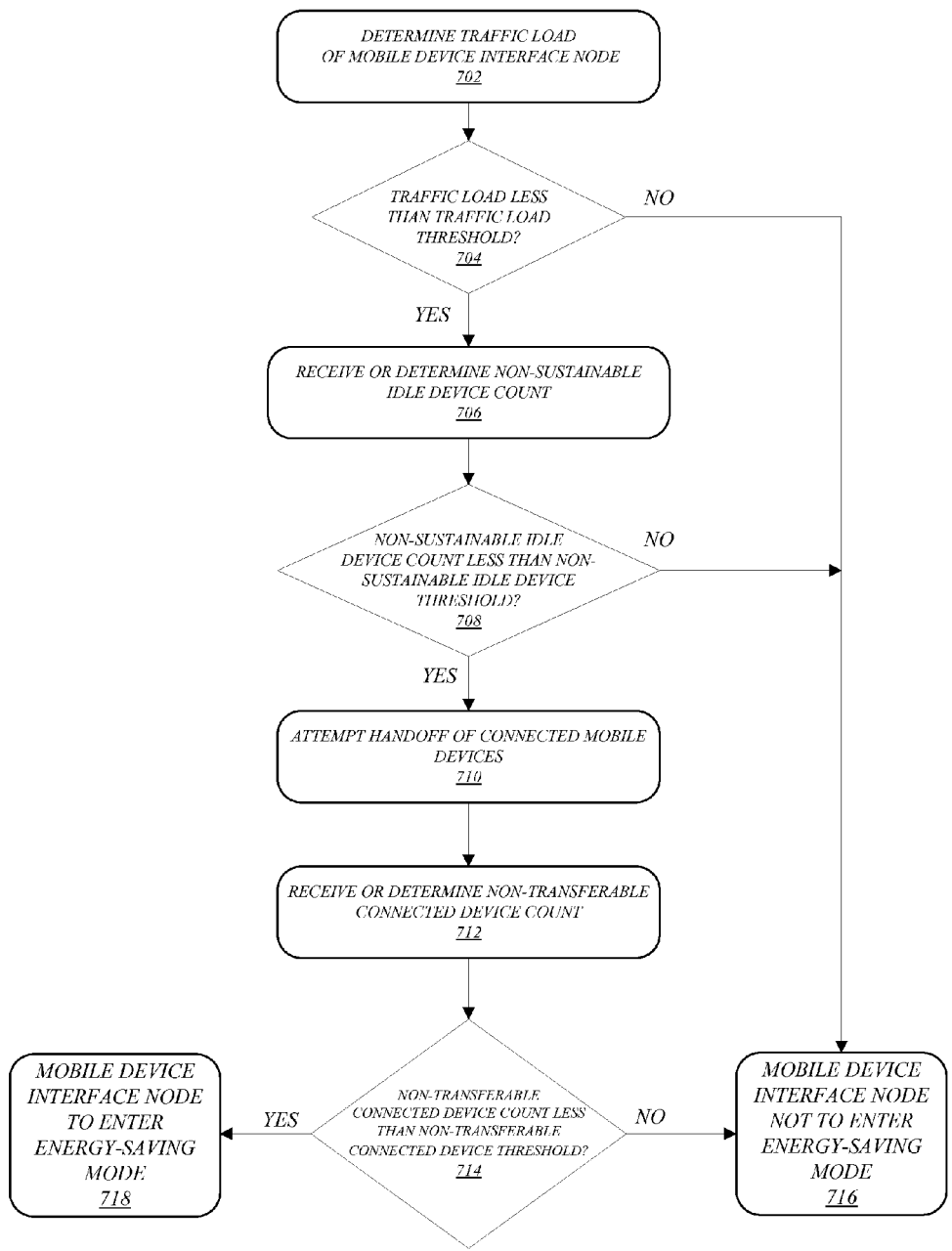
FIG. 7 illustrates an embodiment of a second logic flow.

FIG. 7 illustrates an embodiment of a logic flow 700 that may be representative of some or all of the operations executed by one or more embodiments described herein, such as apparatus 500, system 540, apparatus 600, and/or system 640. More particularly, the logic flow 700 may be implemented by communications components 522-1 and/or 622-1 in FIGS. 5 and 6 respectively, and/or by determination components 522-3 and/or 622-3 in FIGS. 5 and 6 respectively.

In the illustrated embodiment shown in FIG. 7, the logic flow 700 may begin at 702, where a traffic load of a mobile device interface node may be determined. For example, determination component 622-3 of FIG. 6 may determine a traffic load of apparatus 600 and/or system 640. At 704, it may be determined whether the traffic load is less than a traffic load threshold. For example, determination component 622-3 of FIG. 6 may determine whether a traffic load of apparatus 600 and/or system 640 is less than traffic load threshold 661. If it is determined that the traffic load is not less than the traffic load threshold, flow may pass to 716, where it may be determined that the mobile device interface node is not to enter the energy-saving mode. If it is determined that the traffic load is less than the traffic load threshold, flow may pass to 706. At 706, a non-sustainable idle device count may be received or determined. For example, communication component 622-1 of FIG. 6 may receive non-sustainable idle device count 651 from device tracking node 633, or may determine non-sustainable idle device count 651 based on service sustainability information 626 received from device tracking node 633. At 708, it may be determined whether the non-sustainable idle device count is less than a non-sustainable idle device threshold. For example, determination component 622-3 of FIG. 6 may determine whether non-sustainable idle device count 651 is less than non-sustainable idle device threshold 662. If it is determined that the non-sustainable idle device count is not less than the non-sustainable idle device threshold, flow may pass to 716, where it may be determined that the mobile device interface node is not to enter the energy-saving mode. If it is determined that the non-sustainable idle device count is less than the non-sustainable idle device threshold, flow may pass to 710.

At 710, a handoff of one or more connected mobile devices may be attempted. For example, apparatus 600 and/or system 640 may attempt a handoff of one or more connected mobile devices 638-u to one or more other mobile device interface nodes. At 712, a non-transferable connected device count may be received or determined. For example, determination component 622-3 of FIG. 6 may determine non-transferable connected device count 652 for apparatus 600 and/or system 640, or may receive non-transferable connected device count 652 from device tracking node 633.

In various embodiments, the non-transferable connected device count may indicate a number of connected mobile devices for which the handoff was unsuccessful or not possible. For example, non-transferable connected device count 652 in FIG. 6 may indicate a number of connected mobile devices 638-u for which a handoff was unsuccessful or not possible. The embodiments are not limited to this example.

At 714, it may be determined whether the non-transferable connected device count is less than a non-transferable connected device threshold. For example, determination component 622-3 of FIG. 6 may determine whether non-transferable connected device count 652 is less than non-transferable connected device threshold 663. If it is determined that the non-transferable connected device count is not less than the non-transferable connected device threshold, flow may pass to 716, where it may be determined that the mobile device interface node is not to enter the energy-saving mode. If it is determined that the non-transferable connected device count is less than the non-transferable connected device threshold, flow may pass to 718, where it may be determined that the mobile device interface node is to enter the energy-saving mode.

FIG. 8 illustrates an embodiment of a storage medium 800. The storage medium 800 may comprise an article of manufacture. In one embodiment, the storage medium 800 may comprise any non-transitory computer readable medium or machine readable medium, such as an optical, magnetic or semiconductor storage. The storage medium may store various types of computer executable instructions, such as instructions to implement one or both of logic flows 400 and 700. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The embodiments are not limited in this context.

Figure 9:
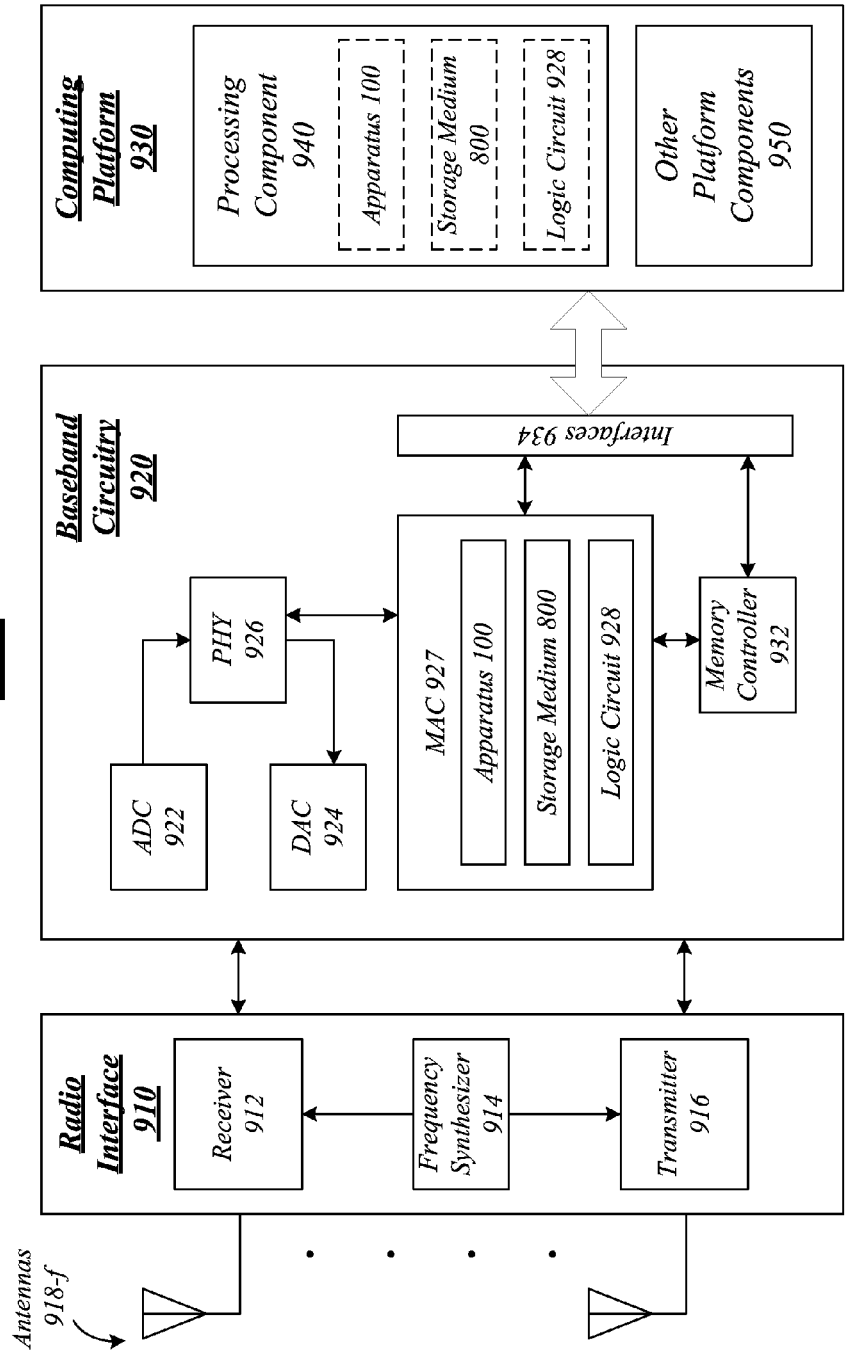
FIG. 9 illustrates an embodiment of a computing architecture.

FIG. 9 illustrates an embodiment of a device 900 for use in a broadband wireless access network. Device 900 may implement, for example, apparatus 200, 500, and/or 600, system 240, 540, and/or 640, storage medium 800 and/or a logic circuit 928. The logic circuit 928 may include physical circuits to perform operations described for apparatus 200, 500, and/or 600, for example. As shown in FIG. 9, device 900 may include a radio interface 910, baseband circuitry 920, and computing platform 930, although the embodiments are not limited to this configuration.

The device 900 may implement some or all of the structure and/or operations for the apparatus 200, 500, and/or 600, system 240, 540, and/or 640, storage medium 800 and/or logic circuit 928 in a single computing entity, such as entirely within a single device. Alternatively, the device 900 may distribute portions of the structure and/or operations for the apparatus 200, 500, and/or 600, system 240, 540, and/or 640, storage medium 800 and/or logic circuit 928 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 910 may include a component or combination of components adapted for transmitting and/or receiving single carrier or multi-carrier modulated signals (e.g., including complementary code keying (CCK) and/or orthogonal frequency division multiplexing (OFDM) symbols although the embodiments are not limited to any specific over-the-air interface or modulation scheme. Radio interface 910 may include, for example, a receiver 912, a frequency synthesizer 914, and/or a transmitter 916. Radio interface 910 may include bias controls, a crystal oscillator and/or one or more antennas 918-f. In another embodiment, radio interface 910 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 920 may communicate with radio interface 910 to process receive and/or transmit signals and may include, for example, an analog-to-digital converter 922 for down converting received signals, a digital-to-analog converter 924 for up converting signals for transmission. Further, baseband circuitry 920 may include a baseband or physical layer (PHY) processing circuit 926 for PHY link layer processing of respective receive/transmit signals. Baseband circuitry 920 may include, for example, a medium access control (MAC) processing circuit 927 for MAC/data link layer processing. Baseband circuitry 920 may include a memory controller 932 for communicating with MAC processing circuit 927 and/or a computing platform 930, for example, via one or more interfaces 934.

In some embodiments, PHY processing circuit 926 may include a frame construction and/or detection module, in combination with additional circuitry such as a buffer memory, to construct and/or deconstruct communication frames and/or packets. Alternatively or in addition, MAC processing circuit 927 may share processing for certain of these functions or perform these processes independent of PHY processing circuit 926. In some embodiments, MAC and PHY processing may be integrated into a single circuit.

The computing platform 930 may provide computing functionality for the device 900. As shown, the computing platform 930 may include a processing component 940. In addition to, or alternatively of, the baseband circuitry 920, the device 900 may execute processing operations or logic for the apparatus 200, 500, and/or 600, system 240, 540, and/or 640, storage medium 800 and/or logic circuit 928 using the processing component 940. The processing component 940 (and/or PHY 926 and/or MAC 927) may comprise various hardware elements, software elements, or a combination of both. Examples of hardware elements may include devices, logic devices, components, processors, microprocessors, circuits, processor circuits (e.g., processor circuit 220), circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 930 may further include other platform components 950. Other platform components 950 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 900 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, subscriber station, mobile subscriber center, radio network controller, router, hub, gateway, bridge, switch, machine, or combination thereof. Accordingly, functions and/or specific configurations of device 900 described herein, may be included or omitted in various embodiments of device 900, as suitably desired. In some embodiments, device 900 may be configured to be compatible with protocols and frequencies associated one or more of the 3GPP LTE Specifications and/or IEEE 802.16 Standards for WMANs, and/or other broadband wireless networks, cited herein, although the embodiments are not limited in this respect.

Embodiments of device 900 may be implemented using single input single output (SISO) architectures. However, certain implementations may include multiple antennas (e.g., antennas 918-f) for transmission and/or reception using adaptive antenna techniques for beamforming or spatial division multiple access (SDMA) and/or using MIMO communication techniques.

The components and features of device 900 may be implemented using any combination of discrete circuitry, application specific integrated circuits (ASICs), logic gates and/or single chip architectures. Further, the features of device 900 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 900 shown in the block diagram of FIG. 9 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Figure 10:
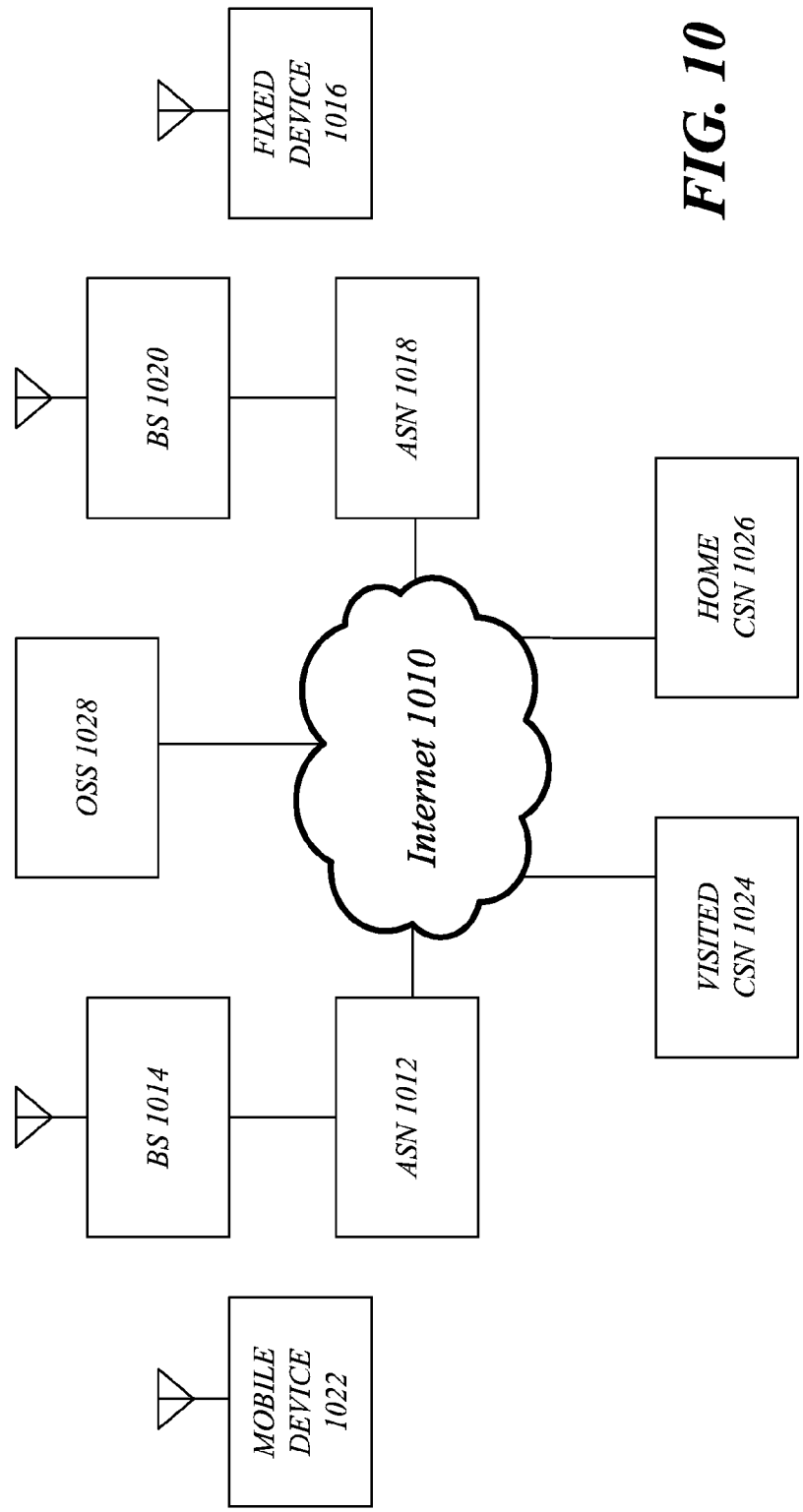
FIG. 10 illustrates an embodiment of a communications system.

FIG. 10 illustrates an embodiment of a broadband wireless access system 1000. As shown in FIG. 10, broadband wireless access system 1000 may be an internet protocol (IP) type network comprising an internet 1010 type network or the like that is capable of supporting mobile wireless access and/or fixed wireless access to internet 1010. In one or more embodiments, broadband wireless access system 1000 may comprise any type of orthogonal frequency division multiple access (OFDMA) based wireless network, such as a system compliant with one or more of the 3GPP LTE Specifications and/or IEEE 802.16 Standards, and the scope of the claimed subject matter is not limited in these respects.

In the exemplary broadband wireless access system 1000, access service networks (ASN) 1012, 1018 are capable of coupling with base stations (BS) (or eNodeBs) 1014, 1020, respectively, to provide wireless communication between one or more fixed devices 1016 and internet 1010 and/or between or one or more mobile devices 1022 and Internet 1010. One example of a fixed device 1016 and a mobile device 1022 is device 900, with the fixed device 1016 comprising a stationary version of device 900 and the mobile device 1022 comprising a mobile version of device 900. ASNs 1012, 1018 may implement profiles that are capable of defining the mapping of network functions to one or more physical entities on broadband wireless access system 1000. Base stations (or eNodeBs) 1014, 1020 may comprise radio equipment to provide RF communication with fixed device 1016 and/or mobile device 1022, such as described with reference to device 900, and may comprise, for example, the PHY and MAC layer equipment in compliance with a 3GPP LTE Specification or an IEEE 802.16 Standard. Base stations (or eNodeBs) 1014, 1020 may further comprise an IP backplane to couple to Internet 1010 via ASNs 1012, 1018, respectively, although the scope of the claimed subject matter is not limited in these respects.

Broadband wireless access system 1000 may further comprise a visited connectivity service network (CSN) 1024 capable of providing one or more network functions including but not limited to proxy and/or relay type functions, for example authentication, authorization and accounting (AAA) functions, dynamic host configuration protocol (DHCP) functions, or domain name service controls or the like, domain gateways such as public switched telephone network (PSTN) gateways or voice over internet protocol (VoIP) gateways, and/or internet protocol (IP) type server functions, or the like. However, these are merely example of the types of functions that are capable of being provided by visited CSN 1024 or home CSN 1026, and the scope of the claimed subject matter is not limited in these respects. Visited CSN 1024 may be referred to as a visited CSN in the case where visited CSN 1024 is not part of the regular service provider of fixed device 1016 or mobile device 1022, for example where fixed device 1016 or mobile device 1022 is roaming away from its respective home CSN 1026, or where broadband wireless access system 1000 is part of the regular service provider of fixed device 1016 or mobile device 1022 but where broadband wireless access system 1000 may be in another location or state that is not the main or home location of fixed device 1016 or mobile device 1022.

Fixed device 1016 may be located anywhere within range of one or both base stations (or eNodeBs) 1014, 1020, such as in or near a home or business to provide home or business customer broadband access to Internet 1010 via base stations (or eNodeBs) 1014, 1020 and ASNs 1012, 1018, respectively, and home CSN 1026. It is worthy of note that although fixed device 1016 is generally disposed in a stationary location, it may be moved to different locations as needed. Mobile device 1022 may be utilized at one or more locations if mobile device 1022 is within range of one or both base stations (or eNodeBs) 1014, 1020, for example.

In accordance with one or more embodiments, operation support system (OSS) 1028 may be part of broadband wireless access system 1000 to provide management functions for broadband wireless access system 1000 and to provide interfaces between functional entities of broadband wireless access system 1000. Broadband wireless access system 1000 of FIG. 10 is merely one type of wireless network showing a certain number of the components of broadband wireless access system 1000, and the scope of the claimed subject matter is not limited in these respects.

The following examples pertain to further embodiments:

A network management node may comprise a processor circuit, a communication component arranged for execution by the processor circuit to receive service sustainability information from a mobility management entity (MME), the service sustainability information describing a set of connective statuses for one or more mobile devices served by an eNodeB, and a determination component arranged for execution by the processor circuit to determine a non-sustainable idle device count for the eNodeB based on the service sustainability information, the non-sustainable idle device count comprising a number of idle mobile devices served by the eNodeB that are not registered with any alternate-standard mobile device interface node, the determination component arranged for execution by the processor circuit to determine whether the eNodeB is to enter an energy-saving mode based on the non-sustainable idle device count.

With respect to such a network management node, the determination component may be arranged for execution by the processor circuit to determine a non-sustainable idle device threshold based on an operator policy.

With respect to such a network management node, the determination component may be arranged for execution by the processor circuit to determine whether the eNodeB is to enter the energy-saving mode based on whether the non-sustainable idle device count is less than a non-sustainable idle device threshold.

With respect to such a network management node, the determination component may be arranged for execution by the processor circuit to determine whether the eNodeB is to enter the energy-saving mode based on a non-transferable connected device count.

With respect to such a network management node, the determination component may be arranged for execution by the processor circuit to determine whether the eNodeB is to enter the energy-saving mode based on whether the non-transferable connected device count is less than a non-transferable connected device threshold.

With respect to such a network management node, the determination component may be arranged for execution by the processor circuit to generate the non-transferable connected device count.

With respect to such a network management node, the determination component may be arranged for execution by the processor circuit to determine a traffic load of the eNodeB.

With respect to such a network management node, the determination component may be arranged for execution by the processor circuit to determine whether the eNodeB is a candidate to enter the energy-saving mode based on whether the traffic load of the eNodeB is less than a traffic load threshold.

A system may comprise such a network management node and an antenna coupled to such a network management node.

A method may comprise transmitting a query to a mobility management entity (MME), receiving a non-sustainable idle device count from the MME in response to the query, the non-sustainable idle device count comprising a number of idle mobile devices served by an eNodeB that are not registered with any alternate-standard mobile device interface node, and determining, by a processor circuit, whether the eNodeB is to enter an energy-saving mode based on the non-sustainable idle device count.

Such a method may comprise determining whether the eNodeB is to enter the energy-saving mode based on whether the non-sustainable idle device count is less than a non-sustainable idle device threshold.

With respect to such a method, the non-sustainable idle device threshold may be defined in an operator policy.

Such a method may comprise generating a non-transferable connected device count and determining whether the eNodeB is to enter the energy-saving mode based on whether the non-transferable connected device count is less than a non-transferable connected device threshold defined in an operator policy.

Such a method may comprise determining a traffic load of the eNodeB and determining that the eNodeB is a candidate to enter the energy-saving mode when the traffic load of the eNodeB is less than a traffic load threshold defined in an operator policy.

A communications device may be arranged to perform such a method.

At least one machine-readable medium may comprise instructions that, in response to being executed on a computing device, cause the computing device to carry out such a method.

A network management node may comprise means for performing such a method.

At least one machine-readable medium may comprise a plurality of instructions that, in response to being executed on a computing device, cause the computing device to receive an operator policy defining a first threshold, transmit a service sustainability information query to a mobility management entity (MME), receive service sustainability information from the MME in response to the service sustainability information query, the service sustainability information comprising a non-sustainable idle device count indicating a number of idle mobile devices served by an eNodeB that are not registered with any alternate-standard mobile device interface node, and determine whether the eNodeB is to enter an energy-saving mode based on the service sustainability information.

Such at least one machine-readable medium may comprise instructions that, in response to being executed on the computing device, cause the computing device to determine whether the eNodeB is to enter the energy-saving mode based on whether the non-sustainable idle device count is less than the first threshold.

Such at least one machine-readable medium may comprise instructions that, in response to being executed on the computing device, cause the computing device to generate a non-transferable connected device count.

With respect to such at least one machine-readable medium, the non-transferable connected device count may indicate a number of connected mobile devices served by the eNodeB for which a handoff was unsuccessful or not possible.

Such at least one machine-readable medium may comprise instructions that, in response to being executed on the computing device, cause the computing device to determine whether the eNodeB is to enter the energy-saving mode based on whether the non-transferable connected device count is less than a second threshold defined in the operator policy.

With respect to such at least one machine-readable medium, the first threshold may comprise a non-sustainable idle device threshold, and the second threshold may comprise a non-transferable connected device threshold.

Such at least one machine-readable medium may comprise instructions that, in response to being executed on the computing device, cause the computing device to determine a traffic load of the eNodeB.

Such at least one machine-readable medium may comprise instructions that, in response to being executed on the computing device, cause the computing device to determine that the eNodeB is a candidate to enter the energy-saving mode when the traffic load of the eNodeB is less than a traffic load threshold defined in the operator policy.

A method may comprise receiving device tracking information, adding, by a processor, the device tracking information to a device tracking table, receiving a service sustainability information query, and generating service sustainability information based on the service sustainability information query and the device tracking table, the service sustainability information describing a set of connective statuses for one or more mobile devices.

With respect to such a method, the device tracking information may indicate that an idle mobile device has entered a non-sustainable idle state.

With respect to such a method, the non-sustainable idle state may comprise a deactivated idle mode signaling reduction (ISR) state.

With respect to such a method, the service sustainability information may comprise a non-sustainable idle device count.

Such a method may comprise modifying an entry in the device tracking table to indicate that an idle mobile device is in a sustainable idle state when the device tracking information indicates that a tracking area update (TAU) request has been received from the idle mobile device before an expiration of a TAU timer and a routing area update (RAU) request has been received from the idle mobile device before an expiration of a RAU timer.

Such a method may comprise modifying an entry in the device tracking table to indicate that an idle mobile device is in a non-sustainable idle state when the device tracking information indicates that a tracking area update (TAU) request has been received from the idle mobile device before an expiration of a TAU timer and a routing area update (RAU) request has not been received from the idle mobile device before an expiration of a RAU timer.

Such a method may comprise modifying an existing entry in the device tracking table to indicate that an idle mobile device is served by a first eNodeB when the device tracking information indicates that a tracking area update (TAU) request has been received from the idle mobile device that indicates that the idle mobile device is served by the first eNodeB and the existing entry indicates that the idle mobile device is served by a second eNodeB.

Such a method may comprise adding an entry to the device tracking table to indicate that an idle mobile device is served by an eNodeB when the device tracking information indicates that a tracking area update (TAU) request has been received from the idle mobile device that indicates that the idle mobile device is served by the eNodeB, and no entry in the device tracking table corresponds to the idle mobile device.

Such a method may comprise deleting an entry in the device tracking table that corresponds to an idle mobile device when the device tracking information indicates that no tracking area update (TAU) request has been received from the idle mobile device before an expiration of a TAU timer.

A communications device may be arranged to perform such a method.

At least one machine-readable medium may comprise instructions that, in response to being executed on a computing device, cause the computing device to carry out such a method.

A network management node may comprise means for performing such a method.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment.

Furthermore, in the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements.

In addition, the term "and/or" may mean "and," it may mean "or," it may mean "exclusive-or," it may mean "one," it may mean "some, but not all," it may mean "neither," and/or it may mean "both," although the scope of claimed subject matter is not limited in this respect. In the following description and/or claims, the terms "comprise" and "include," along with their derivatives, may be used and are intended as synonyms for each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it may be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the scope of the appended claims.

The invention claimed is:

1. A network management node, comprising:
   a transceiver; and
   logic, at least a portion of which is in hardware, the logic to:
      determine a non-sustainable idle device count for an evolved node B (eNodeB) based on service sustainability information received from a mobility management entity (MME); and
      determine whether the eNodeB is to enter an energy-saving mode based on the non-sustainable idle device count for the eNodeB and a non-transferable connected device count for the eNodeB, the non-sustainable idle device count for the eNodeB to indicate a number of idle mobile devices served by the eNodeB that are in an idle-mode signaling reduction (ISR) inactive state, the non-transferable connected device count for the eNodeB to indicate a number of mobile devices served by the eNodeB that are in a connected mode and cannot be handed off.

2. The network management node of claim 1, the logic to determine a non-sustainable idle device threshold based on an operator policy.

3. The network management node of claim 2, the logic to determine whether the eNodeB is to enter the energy-saving mode based on whether the non-sustainable idle device count for the eNodeB is less than the non-sustainable idle device threshold.

4. The network management node of claim 1, the logic to determine whether the eNodeB is to enter the energy-saving mode based on whether the non-transferable connected device count for the eNodeB is less than a non-transferable connected device threshold.

5. The network management node of claim 1, the logic to generate the non-transferable connected device count for the eNodeB.

6. The network management node of claim 1, the logic to determine a traffic load of the eNodeB.

7. The network management node of claim 6, the logic to determine whether the eNodeB is a candidate to enter the energy-saving mode based on whether the traffic load of the eNodeB is less than a traffic load threshold.

8. A computer-implemented method, comprising:
transmitting a query to a mobility management entity (MME);
receiving service sustainability information from the MME in response to the query;
determining a non-sustainable idle device count for an evolved node B (eNodeB) based on the service sustainability information, the non-sustainable idle device count for the eNodeB to indicate a number of idle mobile devices served by the eNodeB that are in an idle-mode signaling reduction (ISR) inactive state; and
determining, by a processor circuit, whether the eNodeB is to enter an energy-saving mode based on the non-sustainable idle device count for the eNodeB and a non-transferable connected device count for the eNodeB, the non-transferable connected device count for the eNodeB to indicate a number of mobile devices served by the eNodeB that are in a connected mode and cannot be handed off.

9. The computer-implemented method of claim 8, comprising determining whether the eNodeB is to enter the energy-saving mode based on whether the non-sustainable idle device count for the eNodeB is less than a non-sustainable idle device threshold.

10. The computer-implemented method of claim 9, the non-sustainable idle device threshold defined in an operator policy.

11. The computer-implemented method of claim 8, comprising determining whether the eNodeB is to enter the energy-saving mode based on whether the non-transferable connected device count for the eNodeB is less than a non-transferable connected device threshold defined in an operator policy.

12. The computer-implemented method of claim 8, comprising:
determining a traffic load of the eNodeB; and
determining that the eNodeB is a candidate to enter the energy-saving mode in response to a determination that the traffic load of the eNodeB is less than a traffic load threshold defined in an operator policy.

13. At least one non-transitory machine-readable medium comprising a plurality of instructions that, in response to being executed on a computing device, cause the computing device to:
receive an operator policy defining a first threshold;
transmit a service sustainability information query to a mobility management entity (MME);
receive service sustainability information from the MME in response to the service sustainability information query, the service sustainability information comprising a non-sustainable idle device count for an evolved node B (eNodeB), the non-sustainable idle device count for the eNodeB indicating a number of idle mobile devices served by the eNodeB that are in an idle-mode signaling reduction (ISR) inactive state; and
determine whether the eNodeB is to enter an energy-saving mode based on the non-sustainable idle device count for the eNodeB and a non-transferable connected device count for the eNodeB, the non-transferable connected device count for the eNodeB to indicate a number of mobile devices served by the eNodeB that are in a connected mode and cannot be handed off.

14. The at least one non-transitory machine-readable medium of claim 13, comprising instructions that, in response to being executed on the computing device, cause the computing device to determine whether the eNodeB is to enter the energy-saving mode based on whether the non-sustainable idle device count for the eNodeB is less than the first threshold.

15. The at least one non-transitory machine-readable medium of claim 13, comprising instructions that, in response to being executed on the computing device, cause the computing device to generate the non-transferable connected device count for the eNodeB.

16. The at least one non-transitory machine-readable medium of claim 13, comprising instructions that, in response to being executed on the computing device, cause the computing device to determine whether the eNodeB is to enter the energy-saving mode based on whether the non-transferable connected device count for the eNodeB is less than a second threshold defined in the operator policy.

17. The at least one non-transitory machine-readable medium of claim 16, the first threshold comprising a non-sustainable idle device threshold, the second threshold comprising a non-transferable connected device threshold.

18. The at least one non-transitory machine-readable medium of claim 13, comprising instructions that, in response to being executed on the computing device, cause the computing device to determine a traffic load of the eNodeB.

19. The at least one non-transitory machine-readable medium of claim 18, comprising instructions that, in response to being executed on the computing device, cause the computing device to determine that the eNodeB is a candidate to enter the energy-saving mode in response to a determination that the traffic load of the eNodeB is less than a traffic load threshold defined in the operator policy.

20. A computer-implemented method, comprising:
receiving device tracking information for an idle mobile device served by an evolved node B (eNodeB);
adding, by a processor, the device tracking information to a device tracking table comprising respective device tracking information for each of a set of idle mobile devices served by the eNodeB, the respective device tracking information for each idle mobile device to indicate whether that idle mobile device is in an idle-mode signaling reduction (ISR) active state or an ISR inactive state;
receiving a service sustainability information query comprising a request for service sustainability information for the set of idle mobile devices served by the eNodeB; and
generating service sustainability information based on the service sustainability information query and the device tracking table, the service sustainability information describing a set of connective statuses for the set of idle mobile devices served by the eNodeB, the service sustainability information to comprise a non-sustainable idle device count for the eNodeB and a non-transferable connected device count for the eNodeB, the non-sustainable idle device count for the eNodeB to indicate a number of idle mobile devices served by the eNodeB that are in the ISR inactive state, the non-transferable connected device count for the eNodeB to indicate a number of mobile devices served by the eNodeB that are in a connected mode and cannot be handed off.

21. The computer-implemented method of claim 20, the ISR inactive state comprising a state in which the idle mobile device is not registered with any alternate-standard mobile device interface node.

22. The computer-implemented method of claim 20, comprising modifying an entry in the device tracking table to indicate that the idle mobile device is in the ISR active state in response to a determination that the received device tracking information indicates that a tracking area update (TAU) request has been received from the idle mobile device before an expiration of a TAU timer and a routing area update (RAU) request has been received from the idle mobile device before an expiration of a RAU timer.

23. The computer-implemented method of claim 20, comprising modifying an entry in the device tracking table to indicate that the idle mobile device is in the ISR inactive state in response to a determination that the received device tracking information indicates that a tracking area update (TAU) request has been received from the idle mobile device before an expiration of a TAU timer and a routing area update (RAU) request has not been received from the idle mobile device before an expiration of a RAU timer.

24. The computer-implemented method of claim 20, comprising modifying an existing entry in the device tracking table to indicate that the idle mobile device is served by the eNodeB in response to a determination that the device tracking information indicates that a tracking area update (TAU) request has been received from the idle mobile device that indicates that the idle mobile device is served by the eNodeB and the existing entry indicates that the idle mobile device is served by a second eNodeB.

25. The computer-implemented method of claim 20, comprising adding an entry to the device tracking table to indicate that the idle mobile device is served by the eNodeB in response to a determination that the device tracking information indicates that a tracking area update (TAU) request has been received from the idle mobile device that indicates that the idle mobile device is served by the eNodeB, and no entry in the device tracking table corresponds to the idle mobile device.

26. The computer-implemented method of claim 20, comprising deleting an entry in the device tracking table that corresponds to the idle mobile device in response to a determination that the device tracking information indicates that no tracking area update (TAU) request has been received from the idle mobile device before an expiration of a TAU timer.

* * * * *